United States Patent [19]
Saito et al.

[11] Patent Number: 5,319,449
[45] Date of Patent: Jun. 7, 1994

[54] WHITE BALANCE CONTROL DEVICE AND VIDEO CAMERA WITH A WHITE BALANCE CONTROL DEVICE

[75] Inventors: Kenji Saito; Yoshio Nakane, both of Tokyo, Japan

[73] Assignee: Fuji Photo Film Company, Limited, Kanagawa, Japan

[21] Appl. No.: 869,008

[22] Filed: Apr. 16, 1992

[30] Foreign Application Priority Data

| Apr. 17, 1991 | [JP] | Japan | 3-085117 |
| Apr. 17, 1991 | [JP] | Japan | 3-085118 |
| Apr. 26, 1991 | [JP] | Japan | 3-96551 |

[51] Int. Cl.$^5$ ............................................. H04N 9/73
[52] U.S. Cl. .................................. 348/223; 348/226; 348/227; 348/910
[58] Field of Search ................. 358/41, 43, 44, 29 C, 358/29; H04N 9/730 C, 9/730

[56] References Cited

U.S. PATENT DOCUMENTS 4,883,360  11/1989  Kawada ........................ 358/29 C

FOREIGN PATENT DOCUMENTS

| 0442269 | 8/1991 | European Pat. Off. . |
| 0452770 | 10/1991 | European Pat. Off. . |
| 0454175 | 10/1991 | European Pat. Off. . |
| 0467685 | 1/1992 | European Pat. Off. . |
| 1318484 | 12/1989 | Japan . |

Primary Examiner—James J. Groody
Assistant Examiner—Sherrie Hsia

[57] ABSTRACT

A white balance control device for a video camera is provided to reduce an occurrence percentage and the degree of color failure, improve the quality of reproduced color and prevent flicker from occurring so that a photograph may be taken properly. A first microcomputer detects a brightness of an object and a condition of a divided light measurement judged from an open degree of an iris. The first microcomputer outputs white balance control signals Rcont and Bcont for equalizing the values of color difference signals R-Y and B-Y to reference values. A white balance control circuit changes the amplification degrees of an elementary red signal R and an elementary blue signal B. When a brightness of an object becomes higher than the previous memorized value and a mode of a divided light measurement is changed, values of white balance control signals Rcont and Bcont are changed. At the other times, the values of the white balance control signals Rcont and Bcont are fixed. The determined values are divided to an area for an inside of an house mode and a outside of a house mode. The quality of reproduced colors is improved by controlling the gain and the hue in a matrix circuit. Under a fluorescent lamp, an electric shutter is actuated with a shutter speed of 1/100 second in order to prevent flicker from occurring.

18 Claims, 14 Drawing Sheets

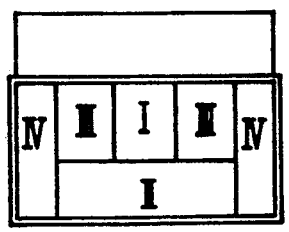
FIG. 2(a)
FIG. 2(b)
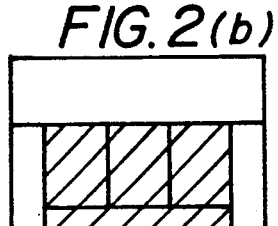
mode 0
FIG. 2(c)
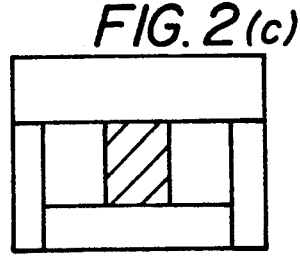
mode 1
FIG. 2(d)
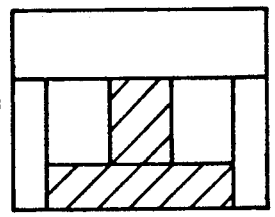
mode 2
FIG. 2(e)
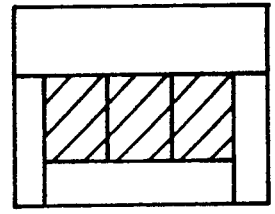
mode 3
FIG. 2(f)
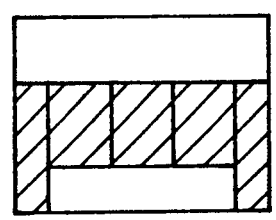
mode 4
FIG. 2(g)
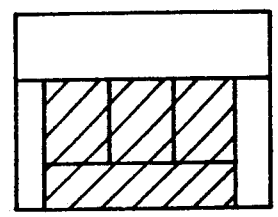
mode 5
FIG. 2(h)
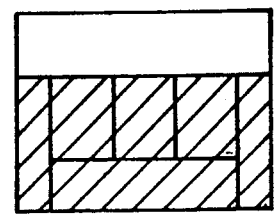
mode 6

WHITE BALANCE CONTROL DEVICE AND VIDEO CAMERA WITH A WHITE BALANCE CONTROL DEVICE

BACKGROUND OF THE INVENTION

1. Field of the Invention

The present invention relates to a white balance control device of a video camera, particularly to a white balance control device for properly controlling white balance by a method of inside light measurement.

The invention further relates to a white balance control device for properly controlling white balance by a method of inside light measurement and a method of divided scope light measurement, and a white balance control device for reducing the occurrence of color failure when photographing under artificial light and natural light.

The invention further relates to a video camera for reproducing proper colors of an object when photographed under a fluorescent lamp and a video camera for photographing an object illuminated by a fluorescent lamp which prevents flicker from occurring.

2. Related Art

In conventional video cameras and video still cameras, a white balance control is utilized in order to reproduce a white object as a white colored material. The white balance control is operated by controlling a gain of a red signal circuit and a gain of a blue signal circuit in the camera based on a green signal as a reference value.

In the white balance control, it is necessary to measure a tint (color temperature) of a photographing working field for operating the white balance control. As methods of the white balance control, there are an outside light measuring method and an inside light measuring method, which are different from each other in measuring the color temperature of the photographing working field.

In the outside light measuring method, a color temperature is directly detected by a color temperature sensor. A white balance control signal for a red signal and a white balance control signal for a blue signal are produced based on reference data detected by the color temperature sensor in order to control the white balance. The color temperature sensor is integrally formed with photo sensors, for example, a photo sensor with a red filter, a photo sensor with a green filter and a photo sensor with a blue filter. The white balance control signal for the red signal and the white balance control signal for the blue signal are produced by an output voltage of each photo sensor, respectively.

On the other hand, in the inside light measuring method, a color temperature is indirectly detected by a color temperature sensor. If a white balance is matching in a picture, an averaged color of whole colors in a picture an becomes achromatic color (grey). The inside light measuring method utilizes this theory That is, an integrated averaged value of color difference signals R-Y and B-Y at a reference color temperature that an averaged color for all of the colors in a picture becomes an achromatic color is designated as a reference value for each signal. Values of the red signal and the blue signal are feed back controlled in order to match the integrated averaged value with the reference value.

OBJECT OF THE PRESENT INVENTION

The condition in which an averaged color becomes an achromatic color in a picture is achieved when the video camera takes a photograph of an ordinal sight in which various colors are mixed randomly. However, when the video camera takes a photograph of an object having a background of a blue sky, a blue ocean or a red wall, the above described condition cannot be accomplished. An averaged color for all of the colors in a picture is not an achromatic color, the averaged color becomes a color with a blue tint or a red tint. If the video camera takes a photograph of an object having a background of one color, the averaged color of the picture is recognized as the achromatic color by a white balance control in the inside light measuring method, although an averaged color in a picture is not an achromatic color. As a result, a reference white level is only slightly different from the true white level. The color of the background is discolored and a color of a main object (person) is controlled to be shifted to its additive complementary color (additive complementary color against the background), and a so called "color failure" occurs.

As a result, in an inside light measurement control, a video camera with a white balance control unit takes a photograph of an ordinal sight in which various colors are mixed randomly, so that the white balance control operates properly. On the other hand, when the video camera takes a photograph of a specific sight in which a specific color dominates, the above described color failure occurs.

To receive the above problem, it is considered that a controllable area of a white balance control should be limited to a small area. For example, on a vector scope of which a transversial axis is a B-Y axis and a longitudinal axis is a R-Y axis, a white balance control is operated in a narrow area near an I axis and the white balance control is not operated in the other area. Phases of the I axis are advanced 33° from phases of the R-Y axis and B Y axis. Such an idea is based on a phenomenon that a characteristic curve is located near the I axis (orange-cyanogen) when the color temperature is changed as one of the parameters on the vector scope. Thereby, even if a sight is photographed in which green grass dominates, a white balance control amount is small with respect to a green-magenta direction so that the color failure is reduced.

However, it is improper for a market-used video camera which is used under sunshine or an artificial light (fluorescent lamp, incandescent lamp) to add a limitation for an area controlled by the white balance control when an automatic white balance control is operated. If a photograph is taken In sunshine, It is possible to operate the white balance control for a specific area near the I axis. When a photograph is taken in artificial light, particularly in light from a fluorescent lamp, the color temperature of the fluorescent lamp is quite different from the color temperature of the sunshine so that the white balance control for a specific area near the I axis cannot be operated. Accordingly, in a conventional method, a white balance controllable area has to be enlarged in order to properly operate the white balance control in a case where a photograph is taken under light from a fluorescent lamp. Therefore, color failure may occur.

When an object is photographed under a fluorescent lamp with a video camera, a skin color of a human cannot be reproduced naturally. Even if the white balance control is solely operated, reproduced colors are not sufficient. That is, there are some cases in which a specific wavelength beam is much stronger than the other beams having another wavelength in light from a fluorescent lamp. Judging from a spectrum analysis for the light from a fluorescent lamp, it may happen that a spectrum balance is not normal and there is a remarkable peak in the spectrum analysis. In these cases, the quality of reproduced colors is degraded by changing a phase and a saturated degree of a color, even if a color temperature is adjusted. On the other hand, in some conventional video cameras, the quality of reproduced colors under a light from other than a fluorescent lamp is sacrificed in order to improve the color reproducing quality when light from a fluorescent lamp is used. FIGS. 13(a) to 13(f) show a spectrum analysis of each fluorescent lamp, respectively.

A technique is known where a color temperature is detected by a sensor or the like and a hue and a gain of a color-difference signal is adjusted depending on the detected color temperature (Japanese Patent Laid-open Application No. Hei 1-318484). However, in this technique, a color temperature simply corresponds to an adjusted amount of a hue and a gain of a color difference signal. If an object is photographed under different fluorescent lamps having different characteristics, the hue and the gain cannot be adjusted depending on the kind of fluorescent lamp. Therefore, a quality of reproduced colors is insufficient in a case where a photograph is taken under different fluorescent lamps.

In an area where a frequency of a market-used battery source is 50 Hz, when an object is irradiated from a fluorescent lamp of which the power is supplied from the market-used battery and the object is photographed, a flicker will occur.

To improve the quality of a picture, a motion picture camera is provided as shown in FIG. 14.

FIG. 14 illustrates a solid state photographing element 01, a gain variable amplifier 02 for amplifying the output of the photographing element 01, a light sensor 03 for sensing a light intensity of a room light, an integrator 04 for integrating the output of the light sensor 03 and a signal processing circuit 05 for processing a video signal.

FIG. 15 illustrates the detailed a structure of the integrator 04. An integrator with a reset element 04a and a hold circuit 04b for storing and sample holding corresponding to a read-out timing are illustrated in FIG. 15.

The photographing element 01, such as a charge coupled device (CCD), stores and reads out a picture signal of the first field simultaneously. The integrator with a reset element 04a can detect a varied amount of the signal from the photographing element 01. As shown in FIG. 15, in the structure of an actual integrator, a reset timing of the integrator with a reset element 04a is the same time to a read-out timing of the photographing element 01. The sampling timing of the sample hold circuit 04b is immediately before the reset timing. Thus, the timing for resetting and sampling of the integrator 04 is the same time to a timing of electric storing and reading in the photographing element 01 A varied amount of flicker or the like in accordance with a condition of a room lamp is detected by the light sensor 03 and the integrator 04. The occurrence of flicker can be reduced by multiplying (gain controlling) an inverse of the varied amount and a signal photographed by the gain variable amplifier 02.

However, under the above described structure, it is necessary to further provide a light source for the light sensor 03 independent from the light source of the photographing element 01. Therefore, a signal of the time when a photograph is taken at a visual angle through a lens is not coincident with a signal in the case that a room light is focused by an optical system of a light sensor. An error occurs when flicker is adjusted, and flicker cannot be adjusted with high accuracy. Further, it is necessary to provide an additional light source other than the light source of the photographing element. As a result, the product cost is increased in conventional video cameras.

An object of the present invention is to provide a white balance device of a video camera which is capable of reducing color failure to resolve the above problems.

Another object of the present invention is to provide a video camera with a color correction element capable of taking a photograph of an object under a fluorescent lamp.

A further object of the present invention is to provide a video camera capable of taking a photograph of an object under a fluorescent lamp without flicker.

SUMMARY OF THE INVENTION

To achieve these objects and to resolve the above problems, a white balance control device in an inside light measuring method of a first embodiment of the present invention operates a white balance control. That is, if a brightness of an object is higher than the previous brightness, a condition for operating the white balance control is revised after the white balance control is converged after turning on the battery of a device. If the brightness of an object is not higher than the previous brightness, the condition for operating the white balance control is maintained.

In the first embodiment, the white balance control is adjusted at a location where it is suitable for taking a photograph. The white balance control is actuated based on the previous condition at a location which is not suitable for taking a photograph.

To resolve the above problems, a white balance control device in an inside light measuring method of a second embodiment of the present invention operates a white balance control. That is, if the white balance control is converged once after a battery is turned on, the condition of the white balance control is fixed. A white balance control is repeated every time when a mode of divided scope light measurement is changed. Subsequently, a new condition of the white balance control is determined.

In the second embodiment, the white balance control is adjusted when the mode of divided scope light measurement is changed. The new condition of the white balance control is maintained until the mode of divided scope light measurement is again changed. While one mode is maintained, color failure does not occur when a photograph is taken of a sight having a background dominated by a red wall. Thus, an occurrence of the color failure can be reduced.

To resolve the above problems, a white balance control device using a method of inside light measuring of a third embodiment of the present invention operates a white balance control. At first, a brightness at an object is detected. If the brightness is higher than the predetermined value, the white balance control device selects a mode for the outside of a house corresponding to a photograph taken under the sunshine. If the brightness is not higher than the predetermined value, the white balance control device selects a mode for the inside of a house corresponding to a photograph taken under an artificial light (a fluorescent lamp, or a cool white light lamp for example). In the mode for the outside of a house, the white balance control is adjusted for a restricted area which is selected by considering a color temperature of the sunshine. In the mode for the inside of a house, the white balance control is adjusted for a restricted area which is selected by considering color temperatures of various artificial lamps.

In the third embodiment, a controllable area of the white balance control is determined depending on the modes for the inside and the outside of a house. The white balance control is actuated in both modes. If a photograph is taken of a sight having green grass, an adjustment of the white balance control is suspended. The adjustment area is restricted, so that over adjustment is prevented and color failure can be reduced.

To resolve the above problems, a white balance control device using a method of inside light measuring of a fourth embodiment of the present invention operates a white balance control. A value of a white balance control signal is converged to a constant value when the white balance control is operated at a predetermined temperature. The kind of light source is determined by the converged value. Further, hue control signals and color difference control signals are adjusted so that the hue and the gain are determined in accordance with the kind of light source.

In the fourth embodiment, the hue and the gain can be controlled in accordance with characteristics of various fluorescent lamps in the case that the light source is a fluorescent lamp. The quality of reproduced colors, such as human skin, is increased.

To resolve the above problems, in a white balance control device using a method of inside light measuring of a fifth embodiment of the present invention, the white balance control is operated. A value of a white balance control signal is converged to a constant value when the white balance control is operated at a predetermined temperature. The white balance control device determines whether a light source is a fluorescent lamp or not by considering the converged value. If it is determined that the light source is a fluorescent lamp, a shutter speed of an electric shutter is set to 1/100.

In the fifth embodiment, flicker can be prevented even if the light source is a fluorescent lamp.

BRIEF DESCRIPTION OF THE DRAWINGS

The present invention will become more fully understood from the detailed description given hereinbelow and the accompanying drawings which are given by way of illustration only, and thus are not limitation of the present invention, and wherein:

FIG. 2(a) to FIG. 2(h) show each mode of a divided scope light measurement;

DETAILED DESCRIPTION OF THE PREFERRED EMBODIMENTS OF THE PRESENT INVENTION

The embodiments according to the present invention will be described with reference to drawings as follows.

Figure 1:
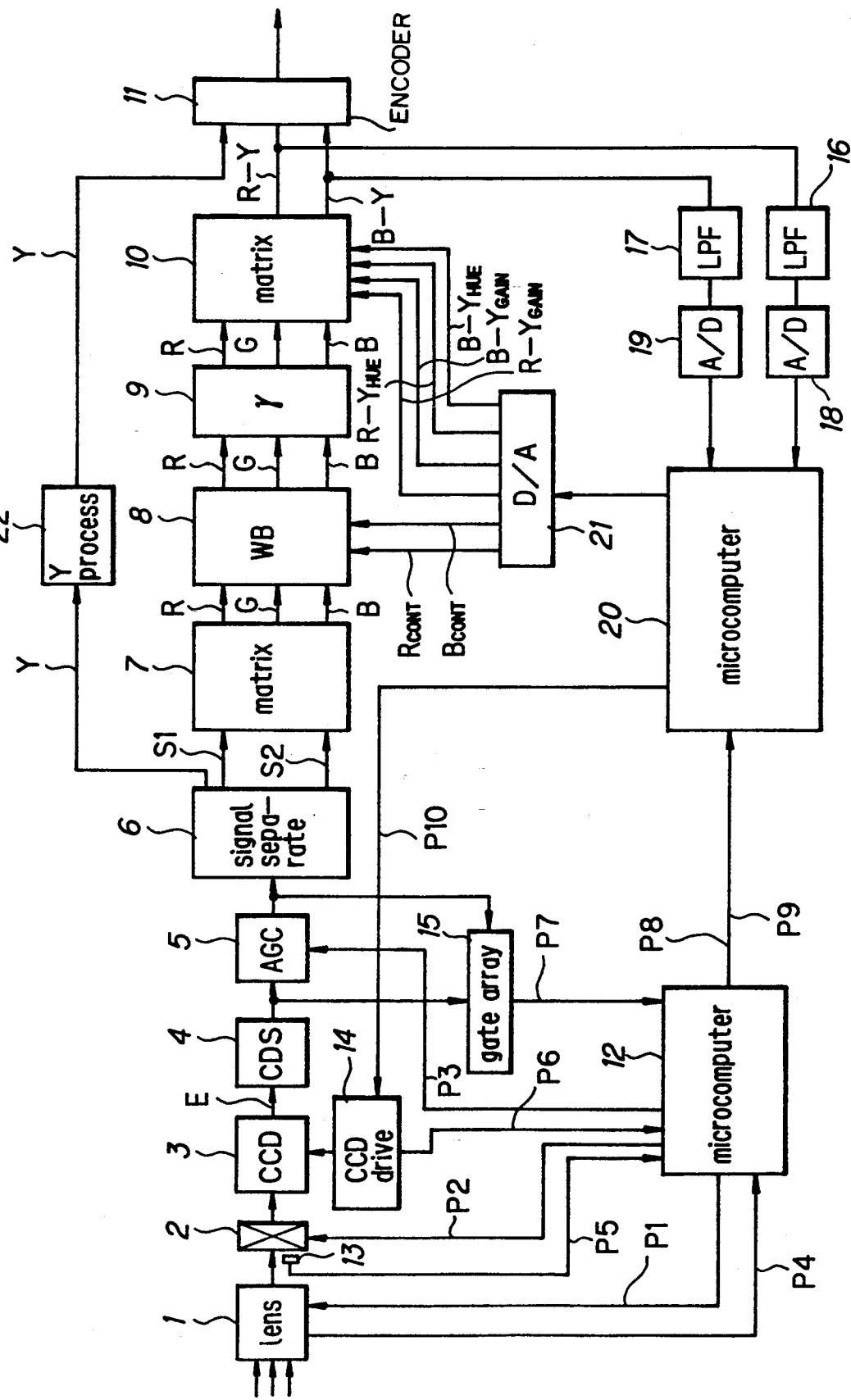
FIG. 1 shows a block diagram of a first embodiment according to the present invention.

FIG. 1 shows a block diagram of a video camera in a first embodiment of the present invention. As shown in FIG. 1, a picture image of an object is formed by a lens 1 and the picture image is input to a charge coupled device (CCD) 3 through an iris 2. Additive complementary color (cyanogen, magenta, yellow, and green) filters are provided at an image pick up surface of the charge coupled device 3. A charge signal E for indicating the object is read out from a reading out circuit (ODS) 4 and the charge signal E is input to a signal separating circuit 6 through an automatic gain circuit (AGC) 5. The signal separating circuit 6 outputs two picture image signals S1 and S2 to a matrix circuit 7 and a brightness signal Y based on the charge signal E. The brightness signal Y is processed at a brightness signal processing circuit 22. In a white balance controller 8, elementary color signals R,G and B from the matrix circuit 7 are adjusted by a white balance control process and then the signals R. 0 and B are adjusted in a adjustment circuit 9 and input to a matrix circuit 10. In the matrix circuit 10, the elementary color signals R, G and B are matrix controlled and color difference signals R-Y and B-Y are output. In an encoder 11, the color-difference signals R-Y and B-Y are orthogonally two phase modulated, the brightness signal Y is added to the signals and then the signal is output as a video signal by the NTSC method.

A first microcomputer 12 outputs an auto-focus control signal P1, an auto iris control signal p2 and an automatic gain control signal P3 to a driving portion for driving the lens 1, the iris 2 and the automatic gain control 5, respectively. The first microcomputer 12 receives zoom information P4 transmitted from the driving portion, iris data P5 indicating an iris opening degree transmitted from a Hall element 13 and driving condition information P6 for indicating a CCD driving condition which is transmitted from a CCD driving circuit 14. The CCD driving circuit 14 drives the CCD in each mode when an electric shutter mode is determined by an electric shutter control signal P10 transmitted from a second microcomputer 20. In a gate array 15, an iris condition is detected by an output signal from the reading out circuit 4 and a condition of the automatic gain control is detected by the output from the automatic gain control circuit 5 and then a detected condition signal P7 is transmitted to the first microcomputer 12.

The first microcomputer 12 calculates the brightness of the object in accordance with the opening degree of the iris 2, a shutter speed and the gain of the automatic gain control circuit 5. If the brightness is high, the iris opening becomes more closed. If the brightness becomes low, the gain of the automatic gain control becomes large. When an electric shutter is actuated, the brightness of the object can be detected by calculating a result of the shutter speed and the gain of the automatic gain control which corresponds to the brightness at the object. An object brightness data P8 calculated in the first microcomputer 12 is serially transmitted to the second microcomputer 20.

On the other hand, the color-difference signals R-Y and B-Y output from the matrix circuit 10 are averaged in low pass filters 16 and 17 for every IV term, respectively. The signals R-Y and B-Y are respectively converted to digital signals in analog/digital converters 18 and 19 and then output to the second microcomputer 20. In the second microcomputer 20, integral averaged values of the color-difference signals R-Y and B-Y, which are calculated in a condition that an averaged color of the whole colors in a picture image of an object becomes an achromatic color at a reference color temperature, are designated as reference values, respectively. A white balance control signal (Rcont) for a red signal, which equalizes the integral averaged value of the color difference signal R-Y and the reference value of the color difference signal R-Y, and a white balance control signal (Bcont) for a blue signal, which equalizes the integral averaged value of the color-difference signal B-Y and the reference value of the color difference signal B-Y, are output from the second microcomputer 20. The signals Rcont and Bcont are analog converted in a digital/analog convertor 21 and then transmitted to a white balance control circuit 8. In the white balance control circuit 8, the gain of an elementary red color signal R and an elementary blue color signal B is controlled in accordance with the value of the white balance control signals Rcont and Bcont, respectively and a feed back control of the white balance is actuated. The timing and areas of the white balance control with respect to the white balance control signals Rcont and Bcont will be described later.

Further, in the second microcomputer 20, color difference gain control signals R-Ygain and B-Ygain for controlling a gain of the color difference signals R-Y and B-Y are output from the matrix circuit 10, respectively and hue control signals R-Yhue and B-Yhue for controlling a phase of the color difference signals R-Y and B-Y are output, respectively. In the matrix circuit 10, a gain degree of the signals is controlled by changing the gain of the color-difference signals R-Y and B-Y depending on the hue gain control signals R-Ygain and B-Ygain and the hue is controlled by changing the phase of the color difference signals R-Y and B-Y depending on the hue control signals R-Yhue and B-Yhue.

In the gate array 15, the output of the CDS 4 is divided into each picture, the brightness information for each picture is integrated and the integrated value is transmitted to the first microcomputer 12. In a method of separating light measurement, the first microcomputer 12 determines a light measurement area by each integrated data and calculates an iris control data from a light measurement value at the light measurement area. Thus, the gate array 15 and the first microcomputer 12 operate the picture separating light measurement together.

FIG. 2(a) to FIG. 2(h) show picture divided areas in each light measurement mode, respectively. FIG. 2(a) shows an area E from where an upper area of a CCD surface is eliminated as a light measurement area. The area E is divided into small areas I, II, III and IV.

If the brightness of the areas I and II is much different from a desired value, the light measurement mode becomes the mode 0. If the brightness at the area I is quite different from a desired value, the light measurement mode becomes the mode 1. If the brightness of the areas I and II are substantially the same and these brightness are quite different from the other areas, the light measurement mode becomes the mode 2. If the brightness of the areas I and III are substantially the same and these brightness are quite different from that of the other areas, the light measurement mode becomes the mode 3. If brightness at the areas I, III and IV are substantially the same and that of the area II is only different from that of the others, the light measurement mode becomes the mode 4. If the brightness of the areas I, II and III are substantially the same and the brightness at the area IV is only different from the others, the light measurement mode becomes the mode 5. If the brightness at the areas I, II, III and IV are substantially the same, the light measurement mode becomes the mode 6.

The first microcomputer 12 selects one of the modes 1 through 6, and then calculates a brightness at an area drawn by the oblique lines as shown in FIG. 2 based on the CCD output signal. An exposure control, for example, a control of an opening degree of the iris 2, is adjusted based on the calculated brightness. If the mode is changed, a mode change signal P9 is transmitted from the first microcomputer 12 to the second microcomputer 20.

The second embodiment according to the present invention will be described next. A timing for controlling a white balance will be described. In the second embodiment, the white balance control is started in accordance with a program of the second microcomputer 20 when a battery source of the second microcomputer 20 is turned on. In the white balance control, the values of the white balance control signals Rcont and Bcont are successively changed until the integral averaged value of the color-difference signals R-Y and B-Y equalizes to the reference value. When the white balance control approaches the most suitable condition for the color temperature at the photographing time, the values of the white balance control signals Rcont and Bcont become constant. For example, if a difference between an Integral averaged value of color difference signals R-Y and B-Y and the reference value is within 10LSB (Least Significant Bit) as a digital amount, it is recognized that the value of the white balance control signals Rcont and Bcont become constant. If a recognition degree becomes more strictly than 10LSB, hunting near the reference value will occur in relation to a detecting timing of the color-difference signal so that the values of the white balance control signals Rcont and Bcont cannot become constant, although the accuracy of the values is increased. In the present embodiment, the difference caused by such an error on a monitor screen cannot be found. If the value becomes constant, the brightness at the time is memorized. Once the value becomes constant, the white balance control is operated next while the constant values of the white balance control signals Rcont and Bcont are fixed, until a new converged brightness is higher than the memorized brightness. The white balance control signals Rcont and Bcont are output for every three orthogonal scanning periods in order to operate the white balance control.

If the brightness at the object becomes highly increased while taking a photograph and the brightness is higher than the memorized brightness, for example, more than 0.4 EV, such a brightness is newly memorized and the values of the white balance control signals Rcont and Bcont are successively changed until the integral averaged value of the color-difference signals R-Y and B Y coincides to the reference value, respectively. If the values of the white balance control signals Rcont and Bcont become constant, such values are fixed. Subsequently, the fixed values of the white balance control signals Rcont and Bcont are used. However, if a brightness is higher than the memorized brightness, the values are renewed.

Figure 3:
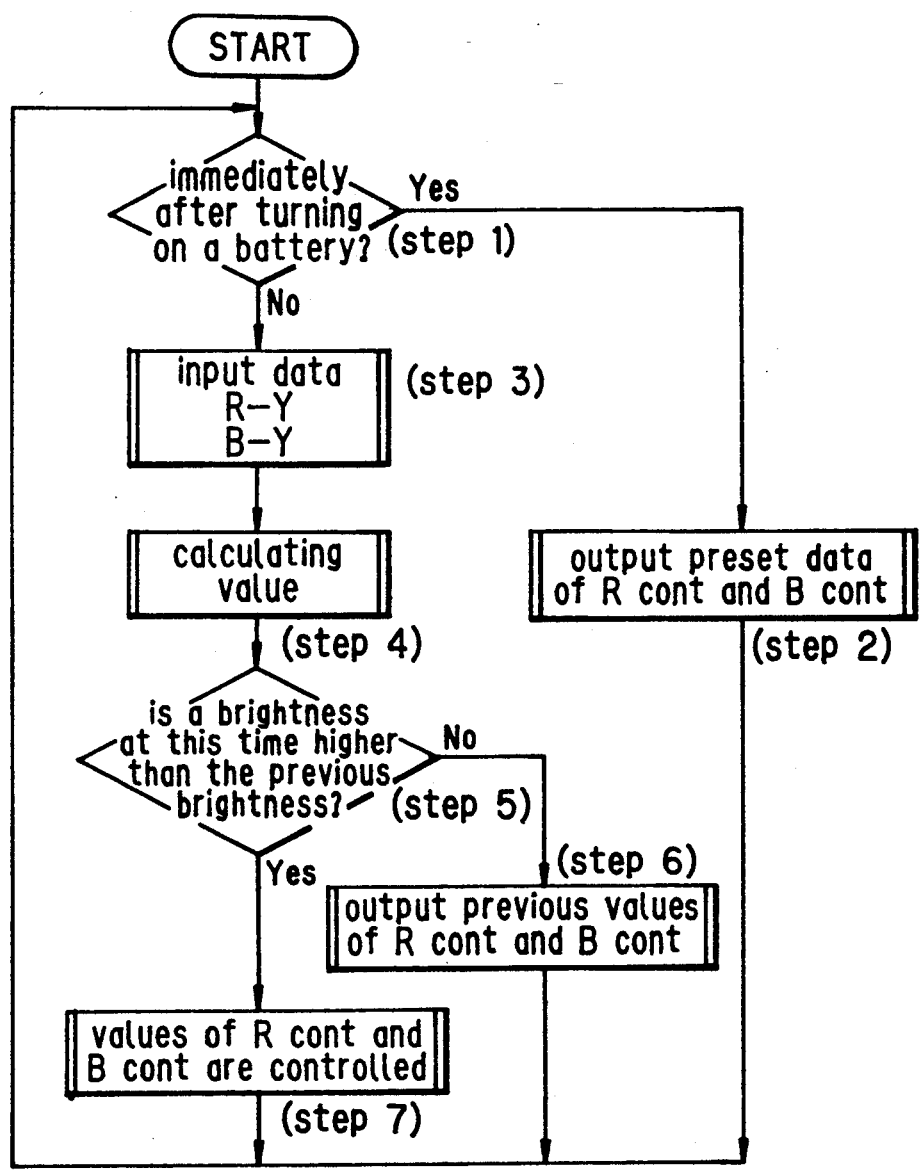
FIG. 3 is a flow chart showing a portion of the operation for the first embodiment.

FIG. 3 shows a flow chart for the operation of the first embodiment according to the present invention. As shown in FIG. 3, immediately after a battery source is turned on (step 1), preset values of the white balance control signals Rcont and Bcont are output, respectively (step 2). After the battery source is turned on, the color-difference signals R-Y and B-Y are received (step 3) and values of the white balance control signals Rcont and Bcont are calculated for making a difference of zero between the integrated value of the color difference signals R-Y and B-Y and the reference value (step 4). In the case that a brightness at this time is higher than that at the previous time (step 5), for example, an iris is moved to a close direction, the white balance control signals Rcont and Bcont calculated at the step 4 are output (step 6). In the case that the brightness of this time is less than that of the previous time (step 5), the white balance control signals Rcont and Bcont of the previous time are output (step 7).

As a result, in the first embodiment, the values of the control signals Rcont and Bcont are renewed only when the brightness of the object becomes higher than the memorized brightness. Thereby, the white balance control is operated more properly. Even if a color failure occurs, the white balance control is operated to reduce an occurrence of the color failure. The reason will be explained as follows.

Generally, a photograph is taken under an illuminating lamp, and the brightness of a white object is higher than the brightness at a blue object or a red object, because the reflectance of the white object is greater than that of the blue object and the red object. In the white balance control of the inside light measuring method, a proper white balance control is operated if a white object is photographed. However, if an object in front of a red or green background sight is photographed, a color failure results. Thereby, it is found that a high brightness at the object relates to a necessary condition for a proper white balance control.

In the first embodiment according to the present invention, for example, when a white wall is photographed at first, the most suitable white balance control is operated. After that, the values cf the white balance control signals Rcont and Bcont are not renewed until the battery source is turned off. Even if a red wall is photographed, a proper white balance control is operated.

The second embodiment according to the present invention will be described next. The operation of the second microcomputer 20 will be mainly described. A timing for adjusting a white balance control will be described first. In the second embodiment, when a battery source is turned on, the white balance control is started in accordance with a program of the second microcomputer 20. When the white balance control is started, the values of the white balance control signals Rcont and Bcont are successively changed until an integral average value of the color difference signals R-Y and B-Y equalizes to the reference value. When the white balance control becomes the most suitable condition corresponding to a color temperature for taking a photograph, the values of the white balance control signals Rcont and Bcont become constant. When the values of the white balance control signals Rcont and Bcont become constant, the values of the white balance control signals Rcont and Bcont are fixed until a mode change signal P9 is input to the second microcomputer 20. Therefore, even if a sight having a specific background is photographed during a period from a time when the white balance signals Rcont and Bcont are fixed to input the mode change signal P9, the white balance control is not changed and a color failure will be not occur.

If a divided light measurement mode is changed and the mode change signal P9 is input to the second microcomputer 20, the fixed white balance control is started and the values of the white balance control signals Rcont and Bcont are successively changed until the integrated average value of the color-difference signals R-Y and B-Y equals the reference value, respectively, while a photograph is taken. When the values of the white balance control signals Rcont and Bcont become constant, the values are fixed until the mode change signal P9 is next input to the second microcomputer 20. Subsequently, the white balance control is repeated every time the mode change signal P9 is input.

Figure 4:
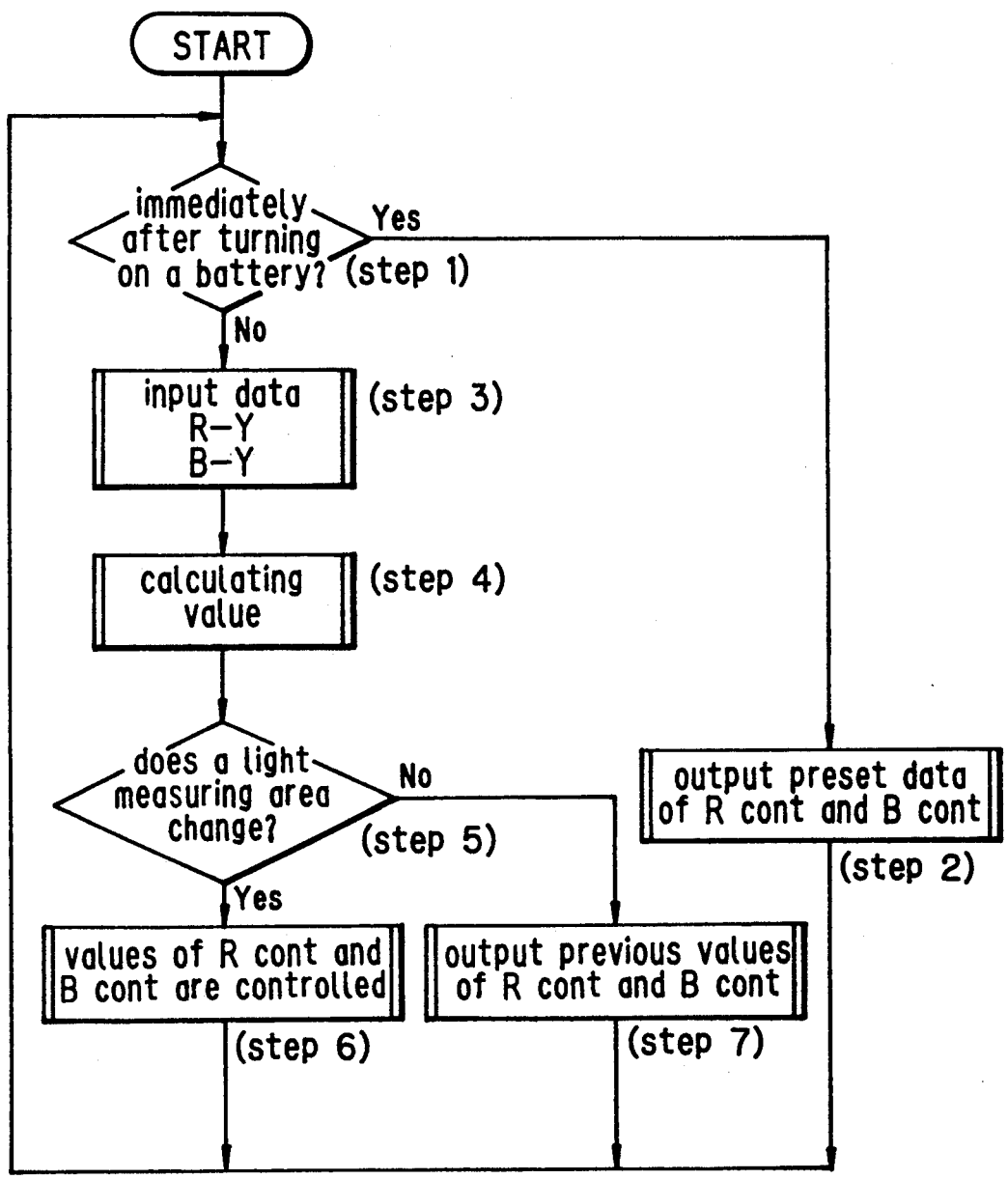
FIG. 4 is a flow chart showing a portion of the operation for the first embodiment.

FIG. 4 shows a flow chart for the operation of the second embodiment. As shown in FIG. 4, immediately after a battery source is turned on (step 1), preset values of the white balance control signals Rcont and Bcont are output, respectively (step 2). After the battery source is turned on, the color-difference signals R-Y and B-Y are received (step 3) and values of the white balance control signals Rcont and Bcont are calculated for making a difference of zero between the integrated value of the color difference signals R-Y and B-Y and the reference value (step 4). In the case that a light measuring mode is changed (step 5), for example, an iris is moved to a close direction, the white balance control signals Rcont and Bcont calculated at the step 4 are output (step 6). In the case that the light measuring mode is not changed (step 5), the white balance control signals Rcont and Bcont of the previous time are output (step 7).

As described above, in one operation of the present embodiment, the values of the white balance control signals Rcont and Bcont are renewed when a brightness at the object is higher than the previous brightness. In another operation of the present embodiment, the values of the white balance control signals Rcont and Bcont are changed when the divided light measurement mode is changed. In a further operation of the present embodiment, when the second microcomputer 20 receives an object brightness data P8 and a mode change signal P9, and then, the brightness at the object becomes higher than the previous brightness and the divided light measurement mode is changed, the values of the white balance control signals Rcont and Bcont are renewed. In a case considering two conditions, an occurrence percentage of a color failure is less than the occurrence percentage of the color failure by considering only one condition.

Figure 5:
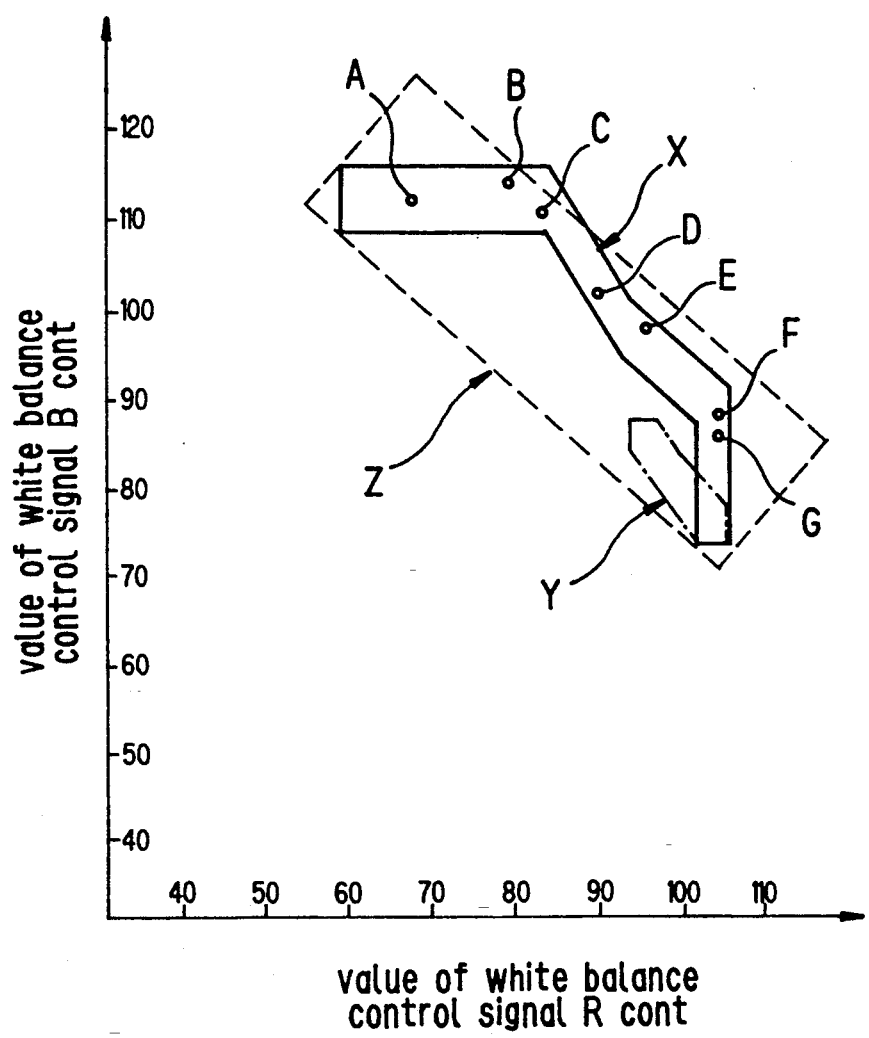
FIG. 5 is a graph showing controllable areas of white control balance.
Figure 6:
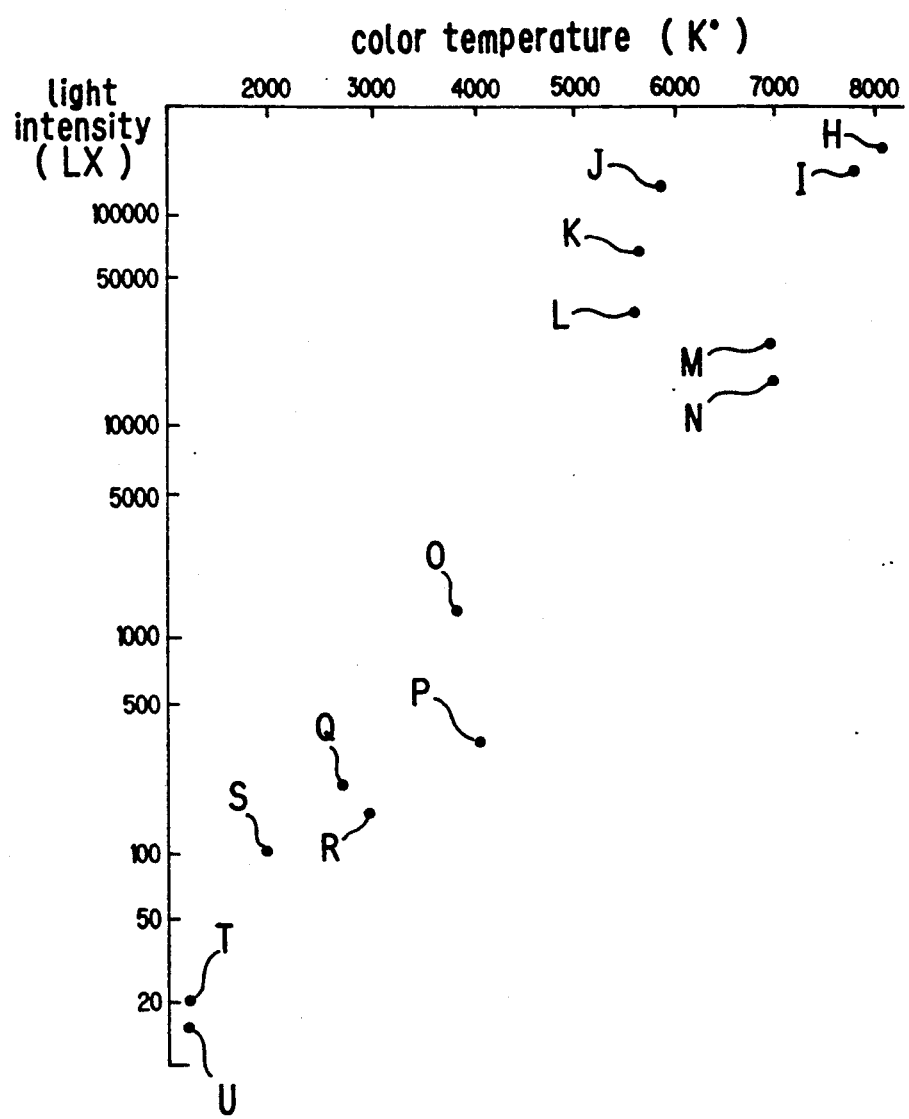
FIG. 6 is a graph showing the characteristics of the relation between brightness and color temperature.

The third embodiment according to the present invention will be described next along with an operation of the second microcomputer 20. As shown in FIG. 6, an area X for an inside of a house mode and an area Y for an outside of a house mode is determined by the second microcomputer 20, respectively. If the inside of a house mode is selected, the values of the white balance control signals Rcont and Bcont are set within the area X surrounded with a solid line as shown in FIG. 5. When a white paper is photographed under various lamps, such as an electric bulb, a cool white normal type fluorescent lamp, a cool white three wavelength type fluorescent lamp, a neutral type fluorescent lamp, a neutral three wavelength type fluorescent lamp, a day light normal type fluorescent lamp and a day light three wavelength fluorescent lamp, each of the values of the white balance control signals Rcont and Bcont are set within a point as shown in FIG. 5, respectively.

In FIG. 5, the points A. B, C, D, E, F, and G correspond with values of the white balance control signals Bcont and Rcont of an electric bulb, a color white normal type fluorescent lamp, a cool white three wavelength type fluorescent lamp, a neutral type fluorescent lamp, a neutral three wavelength type fluorescent lamp, a day light normal type fluorescent lamp and a day light three wavelength fluorescent lamp, respectively. That is, the area X in the inside of a house mode includes the constant values of the white balance control signals Rcont and Bcont when the white balance control is operated for taking a photograph of a white paper under an artificial light, and a width of the area X becomes narrow. On the other hand, when the outside of a house mode is selected, the values of the white balance control signals Rcont and Bcont are set within the area Y surrounded with alternating long and short dash lines as shown in FIG. 5. If the values of the white balance control signals Rcont and Bcont are set within the area Y, the color temperature at the time is within a restricted area which is near the I axis on a vector scope. The area Z is determined by a conventional method. The area Z is much wider than the areas X and Y.

The second microcomputer 20 receives an object brightness data P8 from the first microcomputer 12. In the second microcomputer 20, if the brightness at the object is equal to or higher than the reference value, the outside of a house mode is selected. If the brightness is less than the reference value, the inside of a house mode is selected. The relation between high and low color temperatures and high and low light intensities is illustrated in FIG. 6.

In FIG. 6, points H, I, J, K, L, M and N correspond with values at a snow capped mountain, a beach in the summer, a place under the sunshine at the noon in clear weather, a place under the sunshine at 10 o'clock in the morning in clear weather, a place under the sunshine at 3 o'clock in the afternoon on a day of clear weather, a place under the sunshine at noon on a day of cloudy weather, and a place under sunshine at 10 o'clock in the morning on a day of cloudy weather, respectively. The following points 0, P, Q, R, S, T and U correspond with values at a place one hour after a sunrise time or one hour before a sunset time, a place under two fluorescent lamps (30 W), a place under an incandescent lamp (100 W), a place 30 minutes after a sunrise time or 30 minutes before a sunrise time, a place at a sunset or a sunrise time, a place having a distance 30 cm from a light, and a place having a distance 20 cm from a candle.

The white balance control is operated in the second microcomputer 20 as follows. In the second microcomputer 20, the values of the white balance control signals Rcont and Bcont are successively changed in order to equalize the integral averaged value of the color difference signals R-Y and B-Y to the reference value When the values of the white balance control signals Rcont and Bcont become the most suitable value at a color temperature for taking a photograph, the values of the white balance control signals Rcont and Bcont respectively converge.

Although the value of the white balance control signals Rcont and Bcont are changed until the values become constant, the values of the white balance control signals Rcont and Bcont in the inside of a house mode are within the area Y and the values of the white balance control signals Rcont and Bcont in the outside of a house mode are within the area X. If a photograph is taken of a sight in which various colors are randomly mixed, a proper white balance control is operated in a case that the values of the white balance control signals Rcont and Bcont are converged to a predetermined value within the area X in the inside of a house mode. The values of the white balance control signals Rcont and Bcont are converged to a predetermined value within the area Y in the outside of a house mode.

If a photograph is taken of a sight in which green grass shares a whole photographing scope outside of a house, the values of the white balance control signals Rcont and Bcont are slightly moved toward the outside of the are Y. However, the values of the white balance control signals Rcont and Bcont are suspended at a boundary value of the area Y. As described above, the white balance control is operated so that an occurrence of a color failure can be largely reduced.

If a photograph is taken of a sight in which a red wall shares a whole photographing scope in the inside of a house, the values of the white balance control signals Rcont and Bcont are slightly and continuously moved toward the outside of the area X. However, the values of the white balance control signals Rcont and Bcont are fixed at a boundary value of the area X. As described above, the white balance control is operated properly so that an occurrence of a color failure can be largely reduced.

If the white balance control is automatically operated and then the color failure is reduced regardless of the inside or the outside of a house modes and a natural light or an artificial light, a control area of the white balance control signals Rcont and Bcont is enlarged within the area Z as shown in FIG. 5. The control area is enlarged, and the white balance control is operated by information with the exception of information concerning with the color temperature so that an occurrence of a color failure is increased. In the present embodiment, the modes are divided into the inside of a house mode and the outside of a house mode and an area utilized in each mode is narrowly restricted so that the color failure can be prevented from occurring and the white balance control can be properly operated.

Figure 7A:
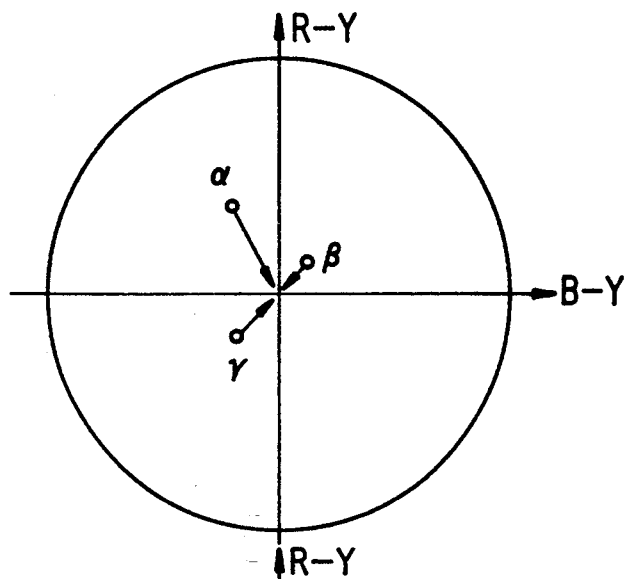
FIG. 7(a) to FIG. 7(c) show an amount and a direction of adjustments on a vector scope.
Figure 7B:
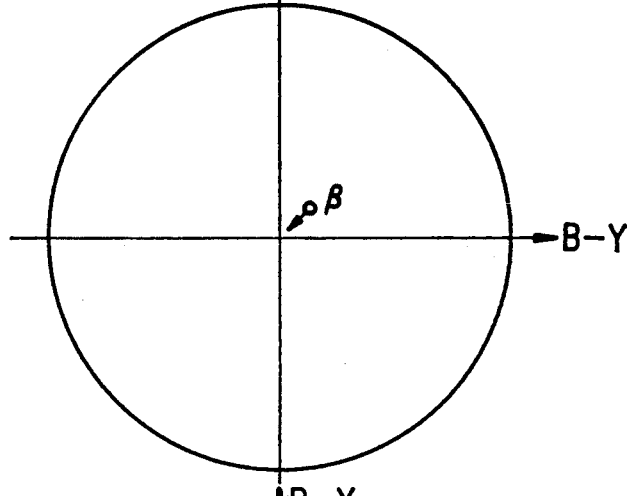
Figure 7C:
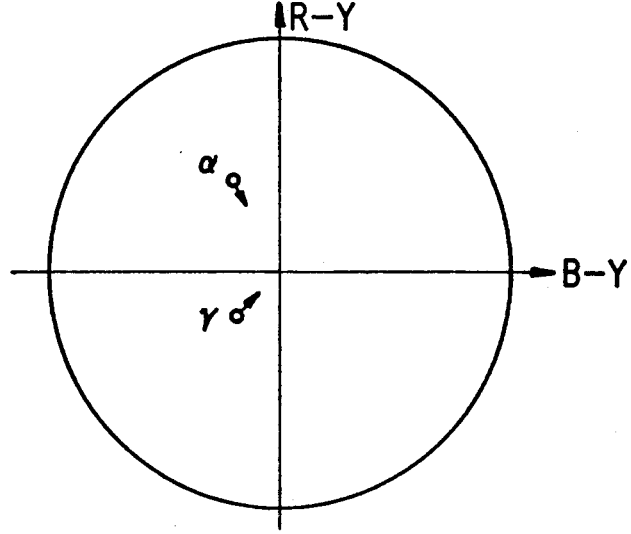

FIG. 7(a) shows an adjustment according to the conventional method on a vector scope. FIGS. 7(b) and 7(c) show adjustments according to the present embodiment on a vector scope, respectively. In FIGS. 7(a) through 7(c), small white circles α, β, γ and mean non-adjusted values at a place in a sunset, in a room of which a wall is magenta and in a green grass, respectively. The arrows from the circles correspond to an amount and a direction of the adjustment for each of the original values, respectively. In these cases, the adjustments are operated for colors which have not been adjusted, therefore, the greater the amount of the adjustments, a greater degree of color failure will result. Conventionally, as shown in FIG. 7(a), the color failure occurs. On the other hand, in the present embodiment, as shown in FIGS. 7(b) and 7(c), the color adjustment is small. It is understood that an occurrence of the color failure is thereby largely reduced.

In the present embodiment, the inside of a house and the outside of a house modes are switched in accordance with a value of a brightness. The value of the brightness for switching the modes is selectable depending on the type of video camera used. The areas X and Y may be designated in accordance with an idea of a design. To simplify a problem, the modes can be selected depending on an iris of a video camera instead of a brightness of an object.

Figure 8:
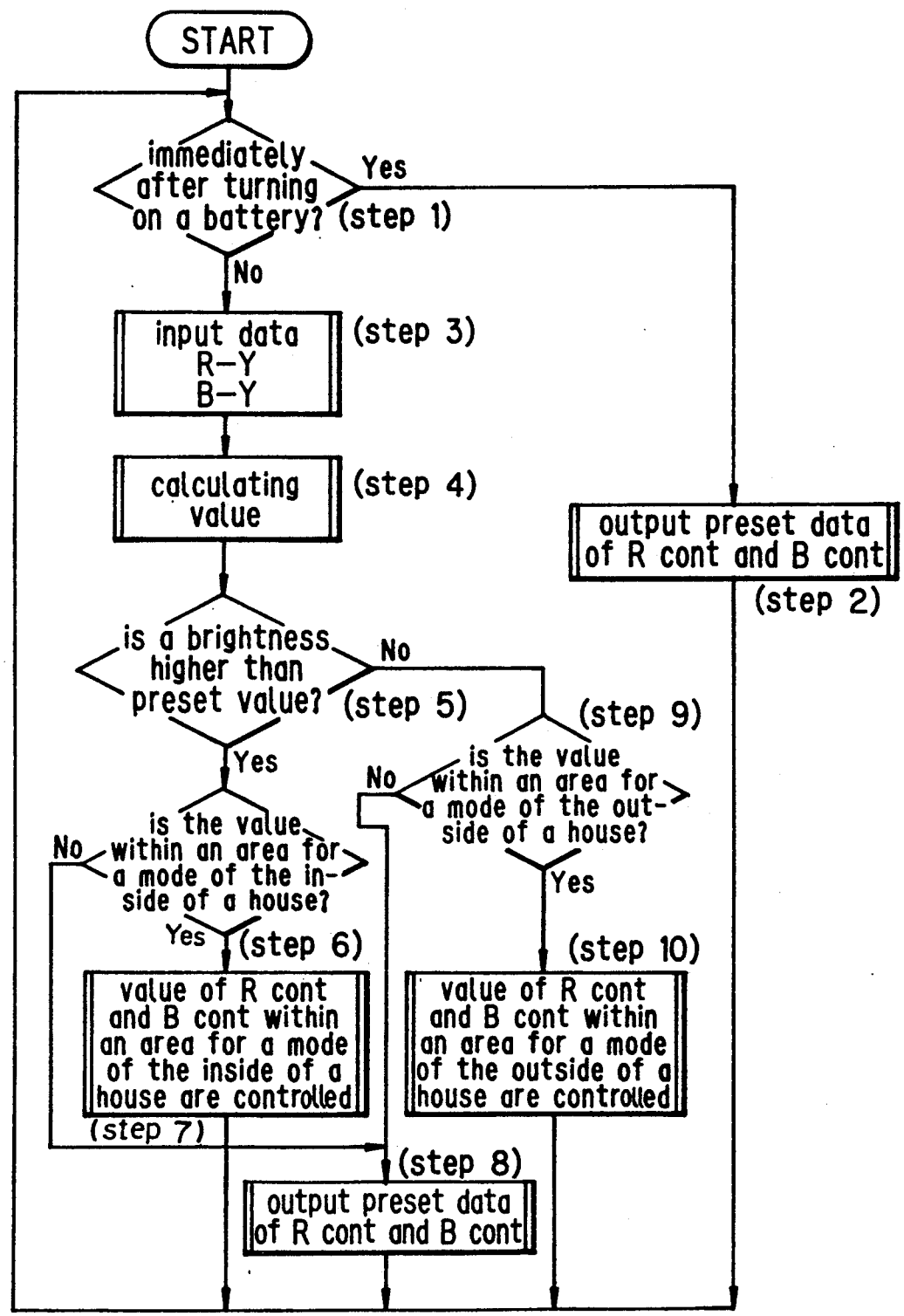
FIG. 8 is a flow chart showing further portions of the operation for another embodiment of the present invention.

FIG. 8 shows a flow chart for another embodiment of the present invention As shown in FIG. 8, immediately after the battery source is input (step 1). the preset values of the white balance control signals Rcont and Bcont are output (step 2). After the battery source is turned on, the color difference signals R-Y and B-Y are received (step 3), and then, a difference between the integrated values of the color difference signals R-Y and B-Y and the values of the white balance control signals Rcont and Bcont is calculated to equalize the reference value at zero (step 4). When the brightness is higher than the predetermined value and the values of the white balance control signals Rcont and Bcont are within the outside of a house mode (steps 5 and 6), new values of the white balance control signals Rcont and Bcont calculated at the step 4 are output, respectively (step 7). When the values of the white balance control signals Rcont and Bcont are not within an area of the inside of a house mode (step 6), the previous values of the white balance control signals Rcont and Bcont are output, respectively (step 8). On the other hand, when the brightness is less than the predetermined value and the values of the white balance control signals Rcont and Bcont are within an area of the outside of a house mode (steps 5 and 9), new values of the white balance control signals Rcont and Bcont calculated at the step 4 are output, respectively (step 10). When the values of the white balance control signals Rcont and Bcont are not within an area of the inside of a house mode, respectively (step 9), the previous white balance control signals Rcont and Bcont are output, respectively.

The fourth embodiment according to the present invention will be described next.

Figure 9:
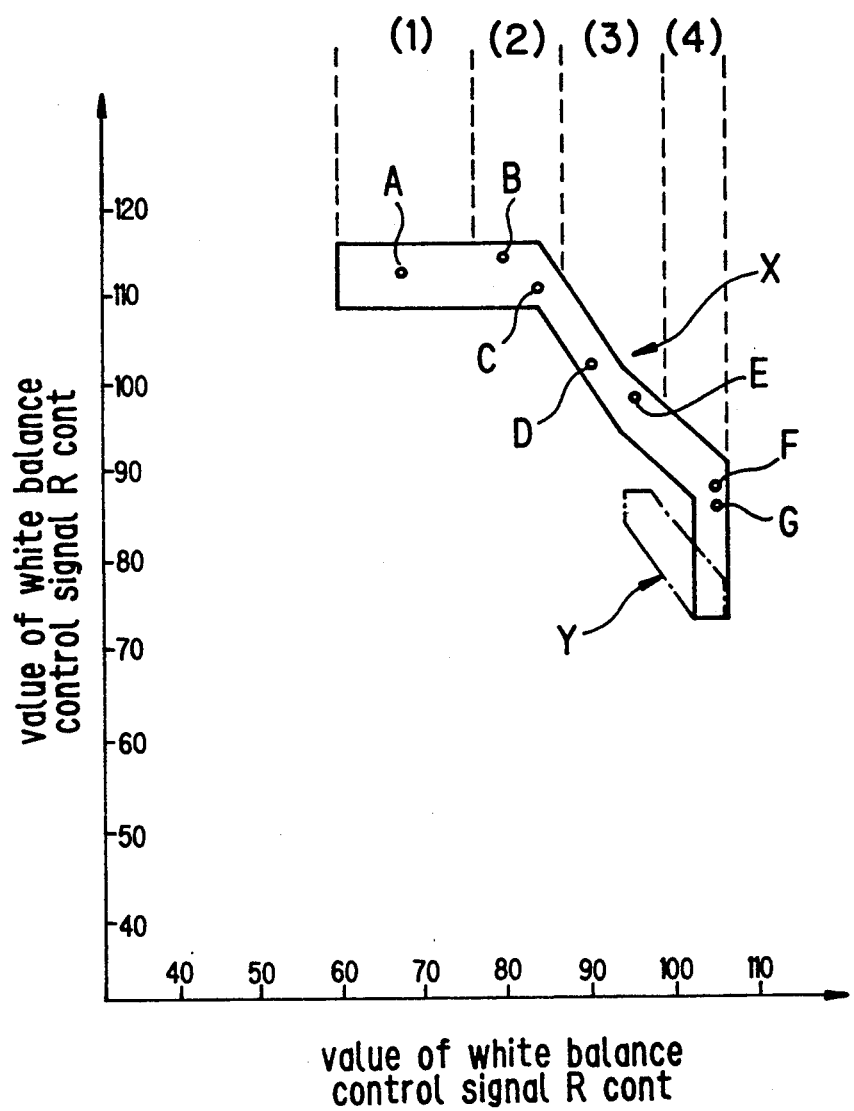
FIG. 9 is a graph showing controllable areas for various fluorescent lamps.

As shown in FIG. B, the modes of the inside and the outside of a house are provided in the second microcomputer 20. When the inside of a house mode is selected, the values of the white balance control signals Rcont and Bcont are set within an area X surrounded with a solid line as shown in FIG. 9. When a white paper photographed under an electric bulb, a cool white type fluorescent lamp, a cool white three wavelength type fluorescent lamp, a neutral type fluorescent lamp, a white three wavelength type fluorescent lamp, a day light normal type fluorescent lamp and a day light three wavelength fluorescent lamp, each of the values of the white balance control signals Rcont and Bcont are set within the area X, respectively.

In FIG. 9, the points A, B, C, D, E, F, and G correspond with values of the white balance control signals Bcont and Rcont of an electric bulb, a cool white normal type fluorescent lamp, a cool white three wavelength type fluorescent lamp, a neutral type fluorescent lamp, a neutral three wavelength type fluorescent lamp, a day light normal type fluorescent lamp and a day light three wavelength fluorescent lamp, respectively. That is, the area X for the inside of the house mode includes the converged value of the white balance control signals Rcont and Bcont when the white balance control is operated for taking a photograph of a white paper under the various artificial lamps and the width of the area M becomes narrower. The area X is divided into four small areas, that is, an electric bulb area (1), a cool white type fluorescent lamp area (2), a neutral type fluorescent lamp area (3) and a day light type fluorescent lamp area (4).

On the other hand, in the outside of a house mode, the values of the white balance control signals Rcont and Bcont are set within an area Y surrounded with alternating long and short dash lines as shown in FIG. 9. If the values of the white balance control signals Rcont and Bcont are within the area Y, respectively, a characteristic of the color temperature at that time is located along a color temperature varying curve line near the I axis on a vector scope.

The second microcomputer 20 receives an object brightness data P8 transmitted from the first microcomputer 12. In the second microcomputer 20, if the object brightness is equal to or higher than the reference value, the outside of a house mode is selected and if the object brightness is lower than the reference value, the inside of a house mode is selected. FIG. 6 illustrates the relation between high and low color temperatures and high and low light intensities.

The white balance control is operated in the second microcomputer 20 as follows. In the second microcomputer 20, the values of the white balance control signals Rcont and Bcont are successively changed in order to equalize the integral averaged value of the color difference signals R-Y and B-Y to the reference value. When the values of the white balance control signals Rcont and Bcont become the most suitable value at a color temperature for taking a photograph, the values of the white balance control signals Rcont and Bcont converge, respectively.

Although the value of the white balance control signals Rcont and Bcont are changed until the values become constant, the values of the white balance control signals Rcont and Bcont in the mode of inside of a house are within the area Y and the values of the white balance control signals Rcont and Bcont in the outside of a house mode are within the area X. If a photograph is taken of a sight in which various colors are randomly mixed, a proper white balance control is operated in a case that the values of the white balance control signals Rcont and Bcont are converged to a predetermined value within the area K in the inside of a house mode.

The values of the white balance control signals Rcont and Bcont are converged to a predetermined value within the area Y in the outside of a house mode.

In a photograph is taken of a sight in which green grass shares a whole photographing scope at the outside of a house, the values of the white balance control signals Rcont and Bcont are slightly moved toward the outside of the area Y. However, the values of the white balance control signals Rcont and Bcont are suspended at a boundary value of the area Y. As described above, the white balance control is operated so that an occurrence of a color failure can be largely reduced.

If a photograph is taken of a sight in which a red wall shares a whole photographing scope at the inside of a house, the values of the white balance control signals Rcont and Bcont are slightly and continuously moved toward the outside of the area X. However, the values of the white balance control signals Rcont and Bcont are fixed at a boundary value of the area X. As described above, the white balance control is operated properly so that an occurrence a color failure can be largely reduced.

When the inside of a house mode is selected and the values of the white balance control signals Rcont and Bcont are converged to a constant value, the second microcomputer 20 detects where the value of the white balance control signals Rcont is located among the area (1) through the area (4) as shown in FIG. 9. If the value of the white control signal Rcont is located in the area (1). the second microcomputer 20 judges the object to be illuminated by an electric bulb. If the value of the white control signal Rcont is located in the area (2), the second microcomputer 20 judges that the object is illuminated by a cool white fluorescent lamp. If the value of the white balance control signal Rcont is located in the area (3), the second microcomputer 20 judges that the object is illuminated by a neutral fluorescent lamp. If the value of the white balance control signal Rcont is located in the area (4), the second microcomputer 20 judges that the object is illuminated by a day light fluorescent lamp.

As described above, the second microcomputer 20 judges kinds of illuminating lamps and adjusts values of the color-difference gain control signals R-Ygain and B-Ygain and the hue control signals R-Yhue and B-Yhue for improving the quality of reproduced colors on a display in order to provide the best gain degree and the best hue condition.

Table 1 shows the characteristics of each fluorescent lamp. Adjustments of color different gain control signals R-Ygain and B Ygain and hue control signals R-Yhue and B-Yhue are operated based on the data described in Table 1. Therefore, even if the fluorescent lamp is used as illumination, the color of human skin is naturally reproduced. If a light source is an electric bulb, the amount of the color difference gain control signals R-Ygain and B-Ygain and the hue control signals R-Yhue and B-Yhue are recognized as a normal amount. However, the amount may be adjusted according to a method for processing signals.

TABLE 1

|  | cool white fluorescent lamp | neutral fluorescent lamp | day light flurorescent lamp |
| --- | --- | --- | --- |
| R-Ygain | increase | decrease | no change |
| B-Ygain | decrease | decrease | decrease |
| R-Yhue | decrease | decrease | decrease |

TABLE 1-continued

|  | cool white fluorescent lamp | neutral fluorescent lamp | day light flurorescent lamp |
| --- | --- | --- | --- |
| B-Yhue | increase | increase | increase |

* the color of light from a neutal fluoresoent lamp is between the color of light from a cool white fluorescent lamp and light from a day light fluorescent lamp.

In the above embodiment, the kinds of the fluorescent lamps are judged from a value of the white balance control signal Rcont. The kinds of fluorescent lamps may be judged from the value of the white balance control signal Bcont set by a judging area corresponding to the white balance control signal Bcont. Further, the kinds of fluorescent lamps may be judged by comparing both converged values of the white balance control signals Rcont and Bcont with the characteristics of each fluorescent lamp as shown in FIG. 9. In the above embodiment, an area for a fluorescent lamp is separated to three areas, an area for a cool white fluorescent lamp, an area for a neutral fluorescent lamp and a day light fluorescent lamp. However, each area may be further separated depending on a normal type fluorescent lamp and a three wavelength type fluorescent lamp.

Figure 10:
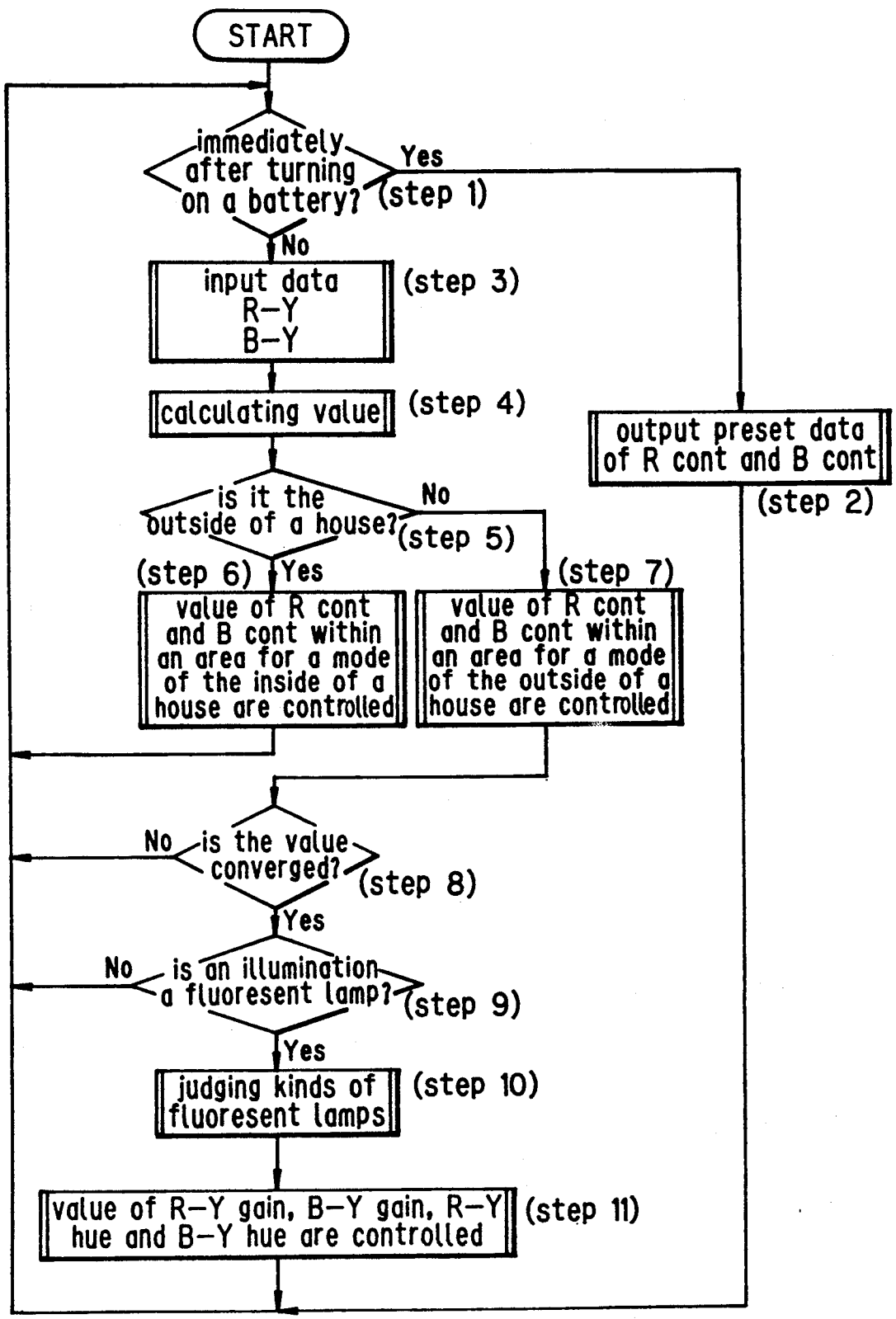
FIG. 10 is a flow chart showing additional portions of the operation for another embodiment of the present invention

FIG. 10 shows a flow chart for an operation of another embodiment according to the present invention. As shown in FIG. 10, immediately after the battery source is input (step 1), the preset values of the white balance control signals Rcont and Bcont are output (step 2). After the battery source is turned on, the color difference signals R-Y and B-Y are received (step 3), and then, a difference between the integrated values of the color difference signals R-Y and B-Y and the values of the white balance control signals Rcont and Bcont is calculated to equalize the reference value at zero (step 4). When the values of the white balance control signals Rcont and Bcont are within an area in the inside of a house mode (steps 5), new values of the white balance control signals Rcont and Bcont for the outside of a house mode calculated at the step 4 are output, respectively (step 6). When the values of the white balance control signals Rcont and Bcont are not within an area of the inside of a house mode (step 5), the last value of the white balance control signals Rcont and Bcont for the inside of a house mode calculated at the step 4 are output, respectively (step 7). When the values of the white balance control signals Rcont and Bcont for the inside of a house mode are converged to a constant value (step 8) and a location corresponding to such a converged value is within an area for a fluorescent lamp (step 9), the kinds of the fluorescent lamps are judged from the location corresponding to the converged value (step 10) and the color difference control signals R-Ygain and B-Ygain and hue control signals R-Yhue and B-Yhue are controlled depending on the kinds of fluorescent lamps (step 11).

A fifth embodiment according to the present invention will be described next along with the operation of the second microcomputer 20. In the second microcomputer 20, the inside of a house mode and the outside of a house mode are set similar to the fourth embodiment of the present invention. The second microcomputer 20 receives a brightness data of an object P8 transmitted from the first microcomputer 12. If the brightness is equal to or more than the predetermined value, the outside of a house mode is selected. If the brightness is less than the predetermined value, the inside of a house mode is selected. In the outside of a house mode, the values of the white balance control signals Rcont and Bcont corresponding to the area Y are output. In the inside of a house mode, the values of the white balance control signals Rcont and Bcont corresponding to the area X are output.

Further, in the fifth embodiment, the values of the white balance control signals Rcont and Bcont are converged to a value corresponding to the areas (2) to (4). It an illuminating light is recognized as a fluorescent lamp, the second microcomputer 20 transmits an electric shutter control signal P10 to the CCD driving circuit 14. Subsequently, the CCD driving circuit 14 sets a shutter speed at 1/100 second and the CCD 3 actuates an electric shutter with the above predetermined shutter speed.

If the shutter speed is set at 1/100 second, a flicker under the illumination of a fluorescent lamp will not occur. This phenomenon will be described with reference to FIGS. 11 and 12 as follows. When the electric shutter is actuated, an amplification degree is increased in the AGC circuit 5.

Figure 11:
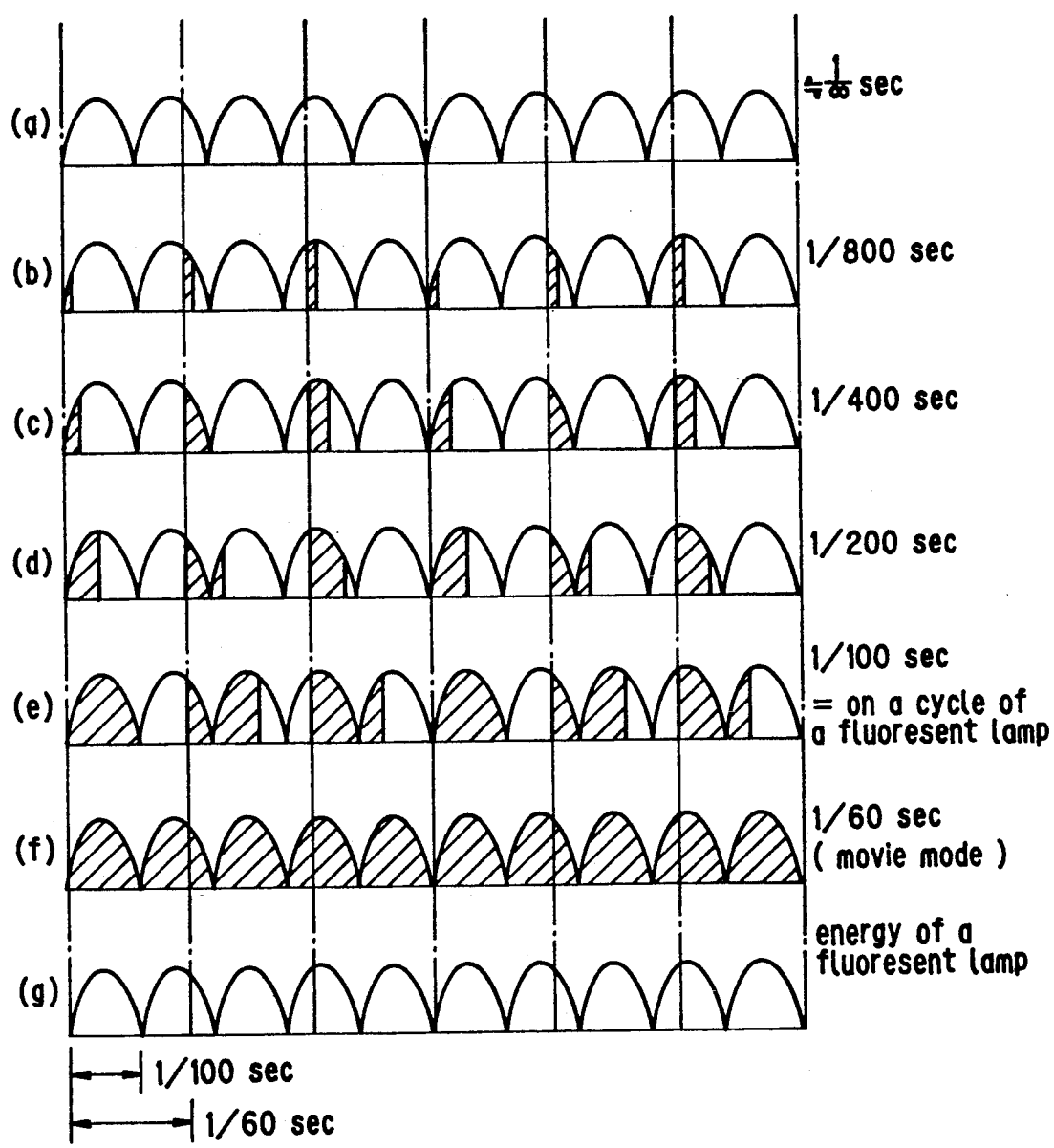
FIG. 11(a) to FIG. 11(g) show the relations between an illuminating condition and an electric storage condition of a 50 Hz cycle fluorescent lamp.

FIGS. 11 (a) to 11(g) show the relation between a light intensity (a waveform illustrated by a solid line) of a fluorescent lamp of which a frequency of a commercial battery is 50 Hz and a stored electric charge amount (an area illustrated by inclined lines) of a charge coupled device of a video camera corresponding to various shutter speeds. In a case that the frequency of the power is 50 Hz, the light intensity of the fluorescent lamp is changed by a frequency of 100 Hz. The electric charge amount stored in the CCD is read out for every one field (1/60 second).

Figure 12:
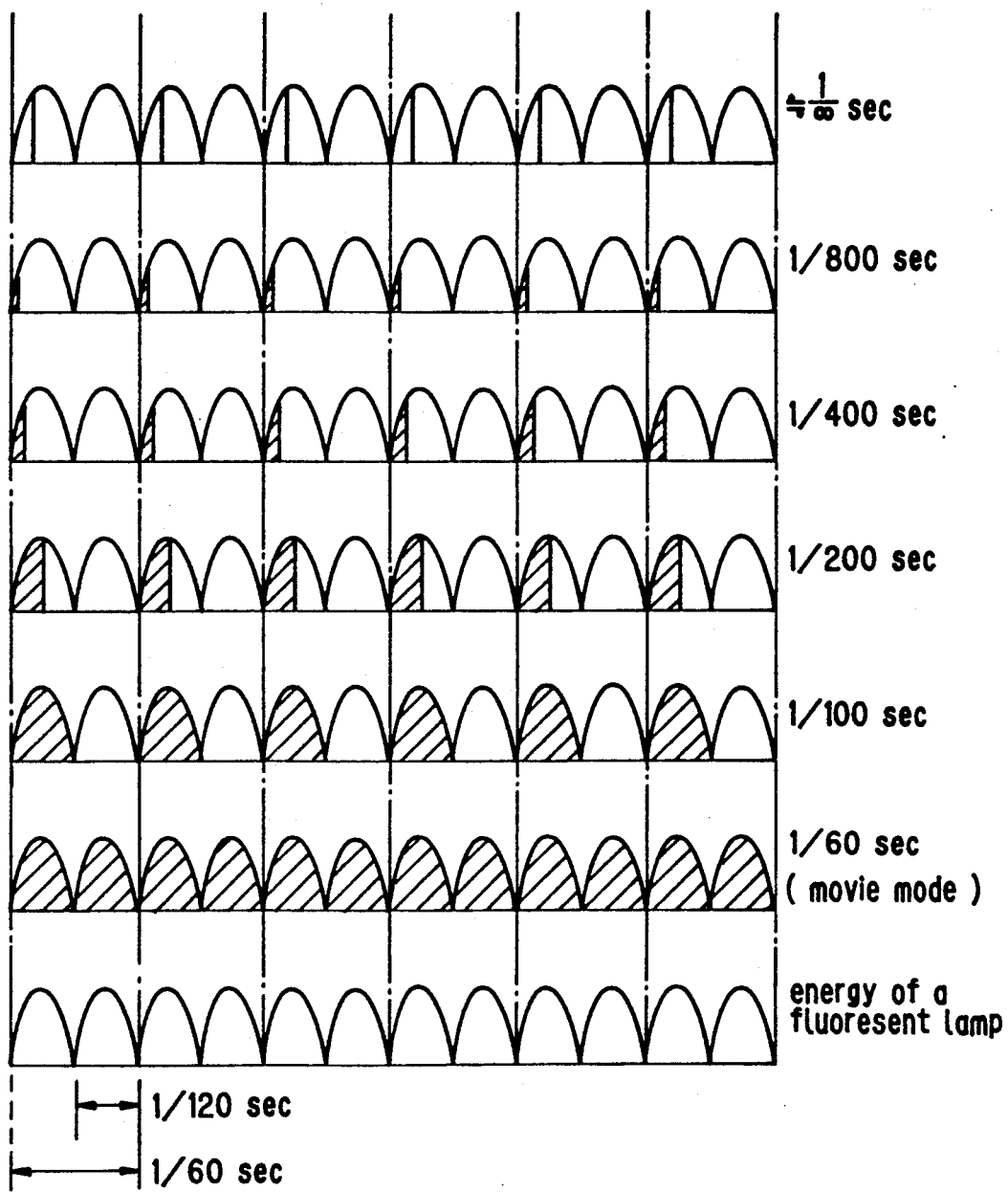
FIG. 12 show the relation between an illuminating condition and an electric storage condition of a 60 Hz cycle fluorescent lamp.
Figure 13A:
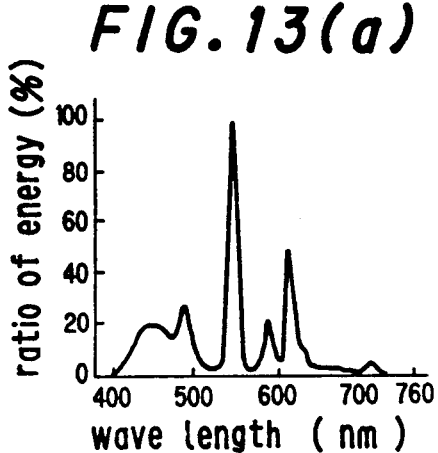
FIG. 13(a) to FIG. 13(f) are graphs for showing a spectrum analysis of each fluorescent lamp.
Figure 13B:
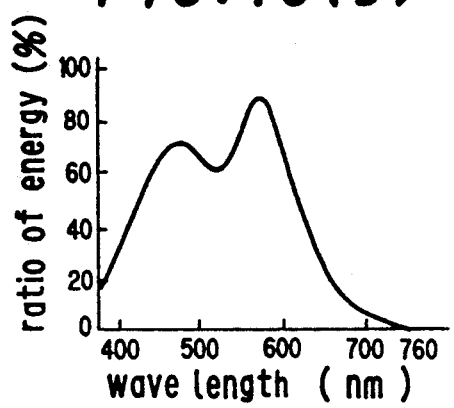
Figure 13C:
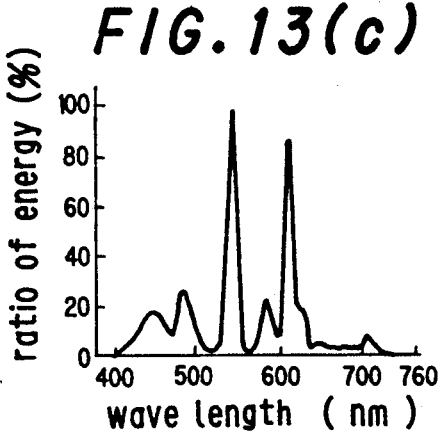
Figure 13D:
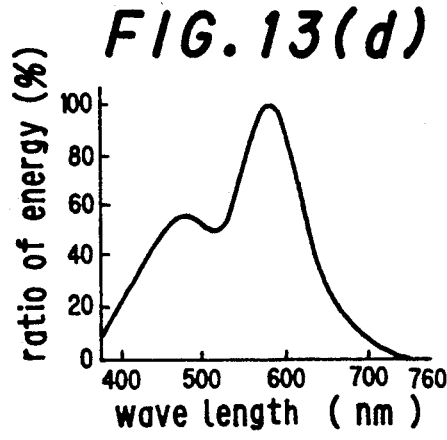
Figure 13E:
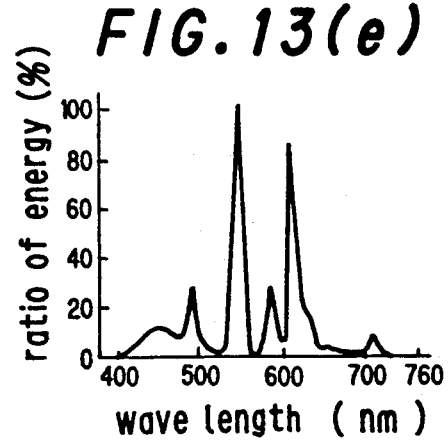
Figure 13F:
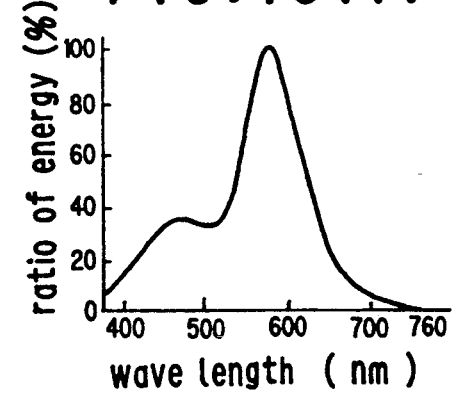
Figure 14:
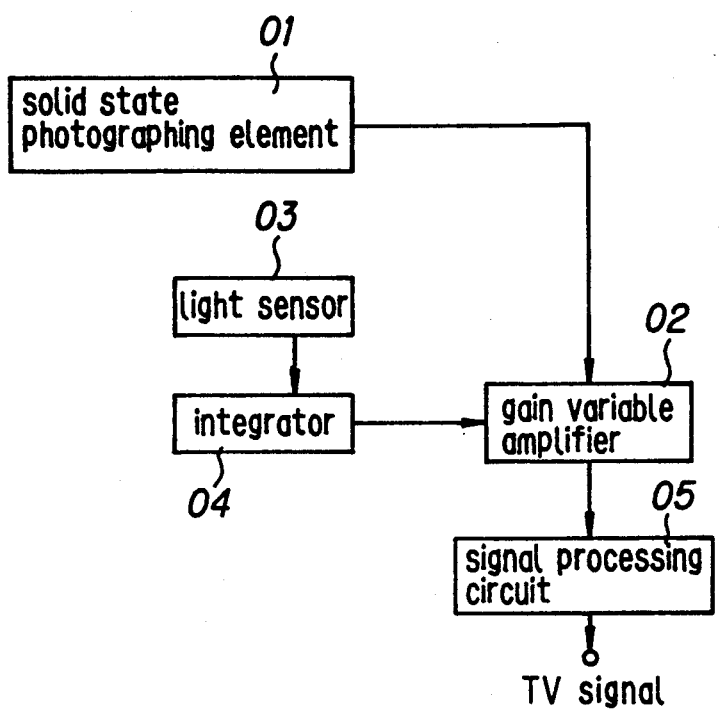
FIG. 14 shows a block diagram of a conventional circuit for preventing flicker.
Figure 15:
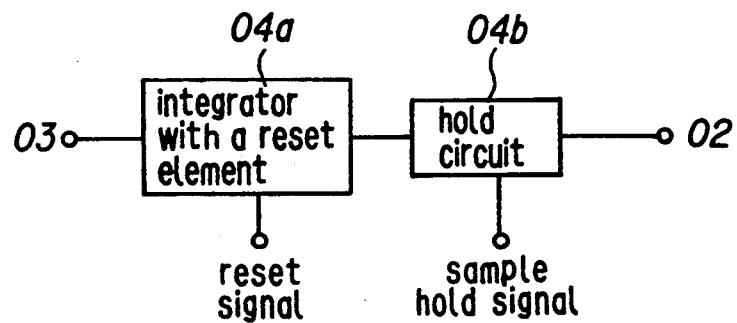
FIG. 15 shows a block diagram of an integrator used for the conventional circuit for preventing flicker.

As shown in FIG. 12, if the electric shutter speed is 1/800 second, 1/400 second and 1/200 second, flicker will occur. An electric charge amount stored in a field and an electric charge amount stored in the successive field are different so that if the electric shutter speed is 1/100 second, the flicker will not occur. Also, an electric storage amount for each field is constant.

FIG. 12 shows a relation between a light intensity of a fluorescent lamp, of which a frequency of a commercial battery is 60 Hz, and a stored electric charge amount of a charge coupled device of a video camera corresponding to various shutter speeds. In this case, flicker will not occur, since an electric amount stored for each field is constant.

As described above, according to the first embodiment of the present invention, values of white balance control signals Rcont and Bcont transmitting to a white balance circuit are renewed at the time when the brightness is higher than the previous brightness. An adjustment of the white balance control is operated for reducing an occurrence percentage of a color failure. Thus, a proper white balance control is operated. Even It the color failure occurs, the white balance is controlled to reduce the degree of the color failure.

According to the second embodiment, values of white balance control signals Rcont and Bcont transmitting to a white balance circuit are renewed only when a divided light measuring mode Is changed. A control condition of the white balance control is fixed at the other time. Unless a color failure occurs in the white balance control, a color failure does not occur when a photograph is taken of an object in front of a mono color background at a period in which the condition of the white balance control is fixed. Thus, an occurrence of the color failure can be reduced.

According to the third embodiment of the present invention, values of white balance control signals Rcont and Bcont are renewed, only when a brightness of an object is higher than the previous brightness and a divided light measuring method is changed, so that an occurrence percentage of a color failure can be remarkably reduced.

According to the third embodiment of the present invention, the white balance control is operated depending on the outside of a house mode and the inside of a house mode, so that a proper white balance control can be operated for each mode. Further, a controllable area for each white balance control is narrow, so that an occurrence of a color failure is largely reduced.

According to the fourth embodiment of the present invention, under a fluorescent lamp, a hue control and a gain control are operated most suitably, so that a quality of reproduced colors such as the color of human skin is increased.

According to the fifth embodiment of the present invention, under a fluorescent lamp, a photograph is taken at an electric shutter speed of 1/100 second, so that flicker does not occur.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A white balance control device for a video camera comprising:
   photographing means for photoelectric converging an image optically formed from an object;
   white balance control means for controlling a white balance by controlling an amplification degree of signals for said image of elementary red and elementary blue among signals of said elementary red, said elementary blue and elementary green obtained by processing output signals of said image from said photographing means;
   a matrix circuit for outputting a first R-Y difference signal and a second B-Y color difference signal by processing elementary signals white balance controlled from said white balance control means;
   processing means for calculating a brightness of said object based on an actuation condition of said video camera for adjusting the brightness of said object; and
   white balance processing means including,
   transmitting means for transmitting a white balance control signal, said white balance control signal actuates said white balance control means for equalizing an averaged integral value of each of said first R-Y and second B-Y color difference signals at a photographing time to a reference value, said reference value is an averaged integral value of each of said first R-Y and second B-Y color difference signals at a reference color temperature, wherein an averaged color of a whole color in a picture becomes an achromatic color at said reference color temperature, and
   renewing means for renewing a value of said white balance control signal in accordance with a value of said first R-Y and second B-Y color difference signals at said photographing time, when said brightness calculated at said processing means is higher than a previous brightness after said value of said white balance control signal is converged by turning on a power of a battery of the camera and maintaining said value of said white balance control signal.

2. A white balance device of a video camera as claimed in claim 1, wherein said white balance processing means further comprises:

recognizing means for recognizing that said value of said white balance control signal is converged when a difference of said averaged integral values of said first R-Y and second B-Y color difference signals at said photographing time and said reference value is less than a predetermined value, and memorizing means for memorizing a brightness of said object at a time when said value of said white balance control signal is converged after said power of said battery is turned on, renewing said value of said white balance control signal in accordance with said first R-Y and second B-Y color difference signals at a time when a new brightness of an object is higher than a memorized value and newly memorizing said brightness, wherein a value of said white balance control signal in accordance with a value of said first R-Y and second B-Y color difference signals is further renewed and said brightness is newly memorized when a brightness is higher than a previous brightness.

3. A white balance control device for a video camera comprising:

solid state photographing means for photoelectric converging an image optically formed from an object;

white balance control means for controlling a white balance by controlling an amplification degree of signals for said image of elementary red and elementary blue among signals of said elementary red, said elementary blue and elementary green obtained by processing output signals of said image from said solid state photographing means;

a matrix circuit for outputting a first R-Y color difference signal and a second B-Y color difference signal by processing elementary signals white balance controlled from said white balance control means:

divided light measuring means for dividing a photographing picture image of said solid state photographing means, selecting a light measuring mode based on a signal output from each of a plurality of divided areas of said photographing picture image of said solid state photographing means and obtaining iris information from a signal obtained from one of said plurality of divided areas which is selected from a corresponding mode;

processing means for calculating a brightness of said object based on an actuation condition of said video camera for adjusting the brightness of said object; and white balance processing means including, transmitting means for transmitting a white balance control signal, said white balance control signal actuates said white balance control means for equalizing an averaged integral value of each of said first R-Y and second B-Y color difference signals at a photographing time to a reference value, said reference value is an averaged integral value of each of said first R-Y and second B-Y color difference signals at a reference color temperature, wherein an averaged color of a whole color in a picture becomes an achromatic color at said reference color temperature, and maintaining means for maintaining a value of said white balance control signal when said value of said white balance control signal is converged after a power of a battery of the camera is turned on, renewing a value of said white balance control signal in accordance with a value of said first R-Y and second B-Y color difference signals at said photographing time, when said brightness calculated at said processing means is higher than a previous brightness and maintaining a renewed value of said white balance control signal until said light measuring mode is changed.

4. A white balance control device for a video camera comprising:

photographing means for photoelectric converting an image optically formed from an object;

white balance control means for controlling a white balance by controlling an amplification degree of signals for said image of elementary red and elementary blue among signals of said elementary red, said elementary blue and elementary green obtained by processing output signals of said image from said photographing means;

a matrix circuit for outputting a first R-Y color difference signal and a second B-Y color difference signal by processing elementary signals white balance controlled from said white balance control means:

processing means for calculating a brightness of said object based on an actuation condition of said video camera for adjusting the brightness of said object;

divided light measuring means for dividing a photographing picture image of said photographing means, selecting a light measuring mode based on a signal output from each of a plurality of divided areas of said photographing picture image of said photographing means and obtaining iris information obtained from one of said plurality of divided areas which is selected from a corresponding mode; and white balance processing means including, transmitting means for transmitting a white balance control signal, said white balance control signal actuates said white balance control means for equalizing an averaged integral value of each of said first R-Y and second B-Y color difference signals at a photographing time to a reference value, said reference value is an averaged integral value of each of said first R-Y and second B-Y color difference signals at a reference color temperature, wherein an averaged color of a whole color in a picture becomes an achromatic color at said reference color temperature, and renewing means for renewing a value of said white balance control signal in accordance with a value of said first R-Y and second B-Y color difference signals at said photographing time, when said brightness calculated at said processing means is higher than a previous brightness after said value of said white balance control signal is converged by turning on a power of a battery of the camera and said light measuring mode of said divided light measuring means is changed for maintaining said value of said white balance control signal.

5. A white balance control device for a video camera comprising:
- photographing means for photoelectric converting an image optically formed from an object;
- white balance control means for controlling a white balance by controlling an amplification degree of signals of elementary red and elementary blue among signals of said elementary red, said elementary blue and elementary green obtained by processing output signals of said image from said photographing means;
- a matrix circuit for outputting a first R-Y color difference signal and a second B-Y color difference signal by processing elementary signals white balance controlled from said white balance control means:
- processing means for calculating a brightness of said object based on an actuation condition of said video camera for brightness of said object; and
- white balance processing means including,
  - transmitting means for transmitting a white balance control signal, said white balance control signal actuates said white balance control means for equalizing an averaged integral value of each of said first R-Y and second B-Y color difference signals at a photographing time to a reference value, said reference value is an averaged integral value of each of said first R-Y and second B-Y color difference signals at a reference color temperature, wherein an averaged color of a whole color in a picture becomes an achromatic color at said reference color temperature, and
  - wherein said white balance processing means determines an area for an outside of a house mode and an inside of a house mode, determined values of said white balance control signal during said white balance controlled by said white balance control means under the sunshine belong to said area for said outside of a house mode and determined values of said white balance control signal during said white balance controlled by said white balance control means under an artificial light belong to said area for said inside of a house mode, and
  - recognizing means for recognizing a value of said white balance control signal within said area for said outside of a house mode, when a brightness of said object calculated by said processing means is hither than a predetermined value, and recognizing a value of said white balance control signal within said area for said inside of said house mode, when a brightness of an object calculated by said processing means is lower than said predetermined value.

6. A white balance control device of a video camera as claimed in claim 5, wherein said area for said inside of a house mode includes each converged value of said white balance control signal of an electric bulb and each kind of a fluorescent lamp during said white balance controlled by said white balance control means when a white object is photographed under said electric bulb or said fluorescent lamp, and said area for said inside of a house mode includes a converged value of said white balance control signal during said white balance controlled by said white balance control means when a white object is photographed under an indirect or a non-optimum amount of sunshine or light having a color temperature lower than a predetermined color temperature range outside of a house, and said area for said inside of a house mode includes each converged value of said white balance control signal during said white balance controlled by said white balance control means when a photograph is taken of a white object under sunshine or light having a color temperature higher than said predetermined color temperature range outside of a house.

7. A video camera with a color compensation function comprising:
- photographing means for photoelectric converting an image optically formed from an object;
- white balance control means for controlling a white balance by controlling an amplification degree of signals for said image of elementary red and elementary blue among signals of said elementary red, said elementary blue and elementary green obtained by processing output signals of said image from said photographing means;
- a first matrix circuit for producing a first R-Y color difference signal and a second B-Y color difference signal by processing elementary color signals white balance controlled from said white balance control means and outputting said first R-Y and second B-Y color difference signals by controlling a phase and a gain of said first R-Y and second B-Y color difference signals; and
- white balance processing means including,
  - white balance control transmitting means for transmitting a white balance control signal, said white balance control signal actuates said white balance control means for equalizing an averaged integral value of each of said first R-Y and second B-Y color difference signals at a photographing time to a reference value, said reference value is an averaged integral value of each of said first R-Y and second B-Y color difference signals at a reference color temperature, wherein an averaged color of a whole color in a picture becomes an achromatic color at said reference color temperature,
  - hue control transmitting means for transmitting a hue control signal for controlling the hue in a second matrix circuit to said first matrix circuit,
  - judging means for judging a kind of light source based on a converged value of said white balance control signal during said white balance controlled by said white balance control means, and
  - adjusting means for adjusting a condition of said hue control signal in accordance with said light source judged by said judging means.

8. A video camera with a color compensation function comprising:
- photographing means for photoelectric converting an image optically formed from an object;
- white balance control means for controlling a white balance by controlling an amplification degree of signals of elementary red and elementary blue among signals for said image of said elementary red, said elementary blue and elementary green obtained by processing output signals of said image from said photographing means;
- a matrix circuit for producing a first R-Y color difference signal and a second B-Y color difference signal by processing elementary color signals white balance controlled from said white balance control means and outputting said first R-Y and second B-Y color difference signals by controlling a phase and a gain of said first R-Y and second B-Y color difference signals;

white balance processing means including, white balance control transmitting means for transmitting a white balance control signal, said white balance control signal actuates said white balance control means for equalizing an averaged integral value of each of said first R-Y and second B-Y color difference signals at a photographing time to a reference value, said reference value is an averaged integral value of each of said first R-Y and second B-Y color difference signals at a reference color temperature, wherein an averaged color of a whole color in a picture becomes an achromatic color at said reference color temperature, hue control transmitting means for transmitting a hue control signal for controlling the hue in said matrix circuit and a color difference gain control signal for controlling said gain of said first R-Y and second B-Y color difference signals in said matrix circuit, judging means for judging a kind of a light source based on a converged value of said white balance control signal during said white balance controlled by said white balance control means, and adjusting means for adjusting conditions of said hue control signal and said color difference gain control signal in accordance with said light source judged by said judging means.

9. A video camera with a color compensation function comprising:

photographing means for photoelectric converting an image optically formed from an object, said photographing means including electric shutter means, white balance control means for controlling a white balance by controlling an amplification degree of signals from said image of elementary red and elementary blue among signals of said elementary red, said elementary blue and elementary green obtained by processing output signals of said image from said photographing means;

a first matrix circuit for producing a first R-Y color difference signal and a second B-Y color difference signal by processing elementary color signals white balance controlled from said white balance control means;

white balance processing means including, transmitting means for transmitting a white balance control signal, said white balance control signal actuates said white balance control means for equalizing an averaged integral value of each of said first R-Y and second B-Y color difference signals at a photographing time to a reference value, said reference value is an averaged integral value of each of said first R-Y and second B-Y color difference signals at a reference color temperature, wherein an averaged color of a whole color in a picture becomes an achromatic color at said reference color temperature, judging means for judging a kind of light source based on a converged value of said white balance control signal during said white balance controlled by said white balance control means, and actuating means for actuating said electric shutter means with a shutter speed of 1/100 second when said light source is judged to be a fluorescent lamp by said judging means.

10. A method for controlling white balance in a video camera, comprising the steps of:

(a) photoelectric converting an image optically formed from an object;

(b) controlling a white balance by controlling an amplification degree of signals for said image of elementary red and elementary blue among signals of said elementary red, said elementary blue and elementary green obtained by processing output signals of said image at said step (a);

outputting a first R-Y difference signal and a second B-Y color difference signal by processing elementary signals white balance controlled at said step (b);

(d) calculating a brightness of said object based on an actuation condition of said video camera for adjusting the brightness of said object;

(e) transmitting a white balance control signal;

(f) equalizing an averaged integral value of each of said first R-Y and second B-Y color difference signals at a photographing time to a reference value, said reference value is an averaged integral value of each of said first R-Y and second B-Y color difference signals at a reference color temperature, wherein an averaged color of a whole color in a picture becomes an achromatic color at said reference color temperature, and (g) renewing a value of said white balance control signal in accordance with a value of said first R-Y and second B-Y color difference signals at said photographing time, when said brightness calculated at said step (d) is higher than a previous brightness after said value of said white balance control signal is converged by turning on a power of a battery of the camera and maintaining said value of said white balance control signal.

11. A method for controlling white balance as claimed in claim 10, further comprising the steps of:

(h) recognizing that said value of said white balance control signal is converged when a difference of said averaged integral values of said first R-Y and second B-Y color difference signals at said photographing time and said reference value is less than a predetermined value;

(i) memorizing a brightness of said object at a time when said value of said white balance control signal is converted after said power of said battery is turned on; and (j) renewing said value of said white balance control signal in accordance with said first R-Y and second B-Y color difference signals at a time when a new brightness of an object is higher than a memorized value and newly memorizing said brightness, wherein a value of said white balance control signal in accordance with said first R-Y and second B-Y color difference signals is further renewed and said brightness is newly memorized when a brightness is higher than a previous brightness.

12. A method for controlling white balance in a video camera, comprising the steps of:

(a) photoelectric converting an image optically formed from an object;

(b) controlling a white balance by controlling an amplification degree of signals for said image of elementary red and elementary blue signals of said elementary red, said elementary blue and elementary green obtained by processing output signals of said image at said step (a);

(c) outputting a first R-Y color difference signal and a second B-Y color difference signal by processing elementary signals white balance controlled at said step (b);

(d) dividing a photographing picture image obtained at said step (a);

(e) selecting a light measuring mode based on a signal output from each of a plurality of divided areas of said photographing picture image;

(f) obtaining iris information from a signal obtained from one of said plurality of divided areas which is selected from a corresponding mode;

(g) calculating a brightness of said object based on an actuation condition of said video camera for adjusting the brightness of said object;

(h) transmitting a white balance control signal;

(i) equalizing an averaged integral value of each of said first R-Y and second B-Y color difference signals at a photographing time to a reference value, said reference value is an averaged integral value of each of said first R-Y and second B-Y color difference signals at a reference color temperature, wherein an averaged color of a whole color in a picture becomes an achromatic color at said reference color temperature;

(j) maintaining a value of said white balance control signal when said value of said white balance control signal is converged after a power of a battery of the camera is turned on;

(k) renewing a value of said white balance control signal in accordance with a value of said first R-Y and second B-Y color difference signals at said photographing time, when said brightness calculated at said step (g) is higher than a previous brightness; and (l) maintaining a renewed value of said white balance control signal until said light measuring mode is changed.

13. A method for controlling white balance control in a video camera, comprising the steps of:

(a) photoelectric converging an image optically formed from an object;

(b) controlling a white balance by controlling an amplification degree of signals for said image of elementary red and elementary blue among signals of said elementary red, said elementary blue and elementary green obtained by processing output signals of said image at said step (a);

(c) outputting a first R-Y color difference signal and a second B-Y color difference signal by processing elementary signals white balance controlled at said step (b);

(d) calculating a brightness of said object based on an actuation condition of said video camera for adjusting the brightness of said object;

(e) dividing a photographing picture image obtained at said step (a);

(f) selecting a light measuring mode based on a signal output from each of a plurality of divided areas of said photographing picture image;

(g) obtaining iris information obtained from one of said plurality of divided areas which is selected from a corresponding mode;

(h) transmitting a white balance control signal;

(i) equalizing an averaged integral value of each of said first R-Y and second B-Y color difference signals at a photographing time to a reference value, said reference value is an averaged integral value of each of said first R-Y and second B-Y color difference signals at a reference color temperature, wherein an averaged color of a whole color in a picture becomes an achromatic color at said reference color temperature; and (j) renewing a value of said white balance control signal in accordance with a value of said first R-Y and second B-Y color difference signals at said photographing time, when said brightness calculated at said step (d) is higher than a previous brightness after said value of said white balance control signal is converged by turning on a power of a battery of the camera and said light measuring mode selected at said step (f) is changed for maintaining said value of said white balance control signal.

14. A method for controlling white balance control in a video camera, comprising the steps of:

(a) photoelectric converging an image optically formed from an object;

(b) controlling a white balance by controlling an amplification degree of signals of elementary red and elementary blue among signals of said elementary red, said elementary blue and elementary green obtained by processing output signals of said image at said step (a);

(c) outputting a first R-Y color difference signal and a second B-Y color difference signal by processing elementary signals white balance controlled at said step (b);

(d) calculating a brightness of said object based on an actuation condition of said video camera for brightness of said object;

(e) transmitting a white balance control signal;

(f) equalizing an averaged integral value of each of said first R-Y and second B-Y color difference signals at a photographing time to a reference value, responsive to said white balance control signal, said reference value is an averaged integral value of each of said first R-Y and second B-Y color difference signals at a reference color temperature;

(g) determining an area for an outside of a house mode and an inside of a house mode, determined values of said white balance control signal during the controlling of said white balance at said step (b) under the sunshine belong to said area for said outside of a house mode and determined values of said white balance control signal during the controlling of said white balance at said step (b) under an artificial light belong to said area for said inside of a house mode;

(h) recognizing a value of said white balance control signal within said area for said outside of a house mode, when a brightness of said object calculated at said strep (d) is higher than a predetermined value; and (i) recognizing a value of said white balance control signal within said area for said outside of a house mode, when a brightness of an object calculated at said strep (d) is lower than said predetermined value.

15. A method for controlling white balance as claimed in claim 14, wherein said area for said inside of a house mode includes each converged value of said white balance control signal of an electric bulb and each kind of a fluorescent lamp during the controlling of said white balance at said step (b) when a white object is photographed under said electric bulb or said fluorescent lamp, and said area for said inside of a house mode includes a converged value of said white balance control signal during the controlling of said white balance at said step (b) when a white object is photographed under an indirect or a non-optimum amount of sunshine or light having a color temperature lower than a predetermined color temperature range outside of a house, and said area for said inside of a house mode includes each converged value of said white balance control signal during the controlling of said white balance at said step (b) when a photograph is taken of a white object under sunshine or light having a color temperature higher than said predetermined color temperature range outside of a house.

16. A method for compensating color in a video camera, comprising the steps of:
  (a) photoelectric converting an image optically formed from an object;
  (b) controlling a white balance by controlling an amplification degree of signals for said image of elementary red and elementary blue among signals of said elementary red, said elementary blue and elementary green obtained by processing output signals of said image at said step (a);
  (c) producing a first R-Y color difference signal and a second B-Y color difference signal by processing elementary color signals white balance controlled at said step (b);
  (d) outputting said first R-Y and second B-Y color difference signals by controlling a phase and a gain of said first R-Y and second B-Y color difference signals;
  (e) transmitting a white balance control signal;
  (f) equalizing an averaged integral value of each of said first R-Y and second B-Y color difference signals at a photographing time to a reference value, said reference value is an averaged integral value of each of said first R-Y and second B-Y color difference signals at a reference color temperature, wherein an averaged color of a whole color in a picture becomes an achromatic color at said reference color temperature;
  (g) transmitting a hue control signal for controlling the hue for said image;
  (h) judging a kind of light source based on a converged value of said white balance control signal during the controlling of said white balance at said step (b); and
  (i) adjusting a condition of said hue control signal in accordance with said light source judged at said step (h).

17. A method for compensating color in a video camera, comprising the steps of:
  (a) photoelectric converting an image optically formed from an object;
  (b) controlling a white balance by controlling an amplification degree of signals of elementary red and elementary blue among signals for said image of said elementary red, said elementary blue and elementary green obtained by processing output signals of said image at said step (a);
  (c) producing a first R-Y color difference signal and a second B-Y color difference signal by processing elementary color signals white balance controlled at said step (b);
  (d) outputting said first R-Y and second B-Y color difference signals by controlling a phase and a gain of said first R-Y and second B-Y color difference signals;
  (e) transmitting a white balance control signal;
  (f) equalizing an averaged integral value of each of said first R-Y and second B-Y color difference signals at a photographing time to a reference value responsive to said white balance control signal, said reference value is an averaged integral value of each of said first R-Y and second B-Y color difference signals at a reference color temperature, wherein an averaged color of a whole color in a picture becomes an achromatic color at said reference color temperature;
  (g) transmitting a hue control signal for controlling the hue for said image and a color difference gain control signal for controlling said gain of said first R-Y and second B-Y color difference signals for said image;
  (h) judging a kind of light source based on a converged value of said white balance control signal during the controlling for said white balance at said step (b); and
  (i) adjusting conditions of said hue control signal and said color difference gain control signal in accordance with said light source judged at said step (h).

18. A method for compensating color in a video camera, comprising the steps of:
  (a) photoelectric converting an image optically formed from an object by photographing means which includes electric shutter means;
  (b) controlling a white balance by controlling an amplification degree of signals from said image of elementary red and elementary blue among signals of said elementary red, said elementary blue and elementary green obtained by processing output signals of said image at said step (a);
  (c) producing a first R-Y color difference signal and a second B-Y color difference signal by processing elementary color signals white balance controlled at said step (b);
  (d) transmitting a white balance control signal;
  (e) equalizing an averaged integral value of each of said first R-Y and second B-Y color difference signals at a photographing time to a reference value, said reference value is an averaged integral value of each of said first R-Y and second B-Y color difference signals at a reference color temperature, wherein an averaged color of a whole color in a picture becomes an achromatic color at said reference color temperature;
  (f) judging a kind of light source based on a converged value of said white balance control signal during the controlling for said white balance at said step (b); and
  (g) actuating said electric shutter means with a shutter speed of 1/100 second when said light source is judged to be a fluorescent lamp at said step (f).

* * * * *